US009944733B2

(12) United States Patent
Berbee et al.

(10) Patent No.: US 9,944,733 B2
(45) Date of Patent: Apr. 17, 2018

(54) ETHYLENE-BASED POLYMERS FORMED USING ASYMMETRICAL POLYENES

(71) Applicant: Dow Global Technologies LLC, Midland, MI (US)

(72) Inventors: Otto J. Berbee, Hurst (NL); Christopher R. Eddy, Lake Jackson, TX (US); Stefan Hinrichs, Wondelgem (BE); Sarat Munjal, Lake Jackson, TX (US); John O. Osby, Lake Jackson, TX (US)

(73) Assignee: Dow Global Technologies LLC, Midland, MI (US)

( * ) Notice: Subject to any disclaimer, the term of this patent is extended or adjusted under 35 U.S.C. 154(b) by 0 days.

(21) Appl. No.: 15/100,526

(22) PCT Filed: Dec. 23, 2014

(86) PCT No.: PCT/US2014/072100

§ 371 (c)(1),
(2) Date: May 31, 2016

(87) PCT Pub. No.: WO2015/100302

PCT Pub. Date: Jul. 2, 2015

(65) Prior Publication Data

US 2016/0297905 A1 Oct. 13, 2016

Related U.S. Application Data

(60) Provisional application No. 61/920,916, filed on Dec. 26, 2013.

(51) Int. Cl.

| | |
|---|---|
| ***C08F 210/02*** | (2006.01) |
| ***C08L 23/08*** | (2006.01) |
| ***C09D 123/08*** | (2006.01) |
| ***C08F 10/02*** | (2006.01) |

(52) U.S. Cl.

CPC ............ *C08F 210/02* (2013.01); *C08F 10/02* (2013.01); *C08L 23/08* (2013.01); *C08L 23/0869* (2013.01); *C09D 123/08* (2013.01); *C09D 123/0869* (2013.01); *C08L 2205/025* (2013.01)

(58) Field of Classification Search

CPC ........ C08F 210/02; C08F 10/02; C08L 23/08; C08L 23/0869; C08L 2205/025; C09D 123/08; C09D 123/0869

USPC .......................... 526/298, 320, 316; 524/585

See application file for complete search history.

(56) References Cited

U.S. PATENT DOCUMENTS

| | | | |
|---|---|---|---|
| 4,916,255 | A | 4/1990 | Kobayashi et al. |
| 5,844,045 | A | 12/1998 | Kolthammer et al. |
| 5,869,575 | A | 2/1999 | Kolthammer et al. |
| 6,448,341 | B1 | 9/2002 | Kolthammer et al. |
| 6,538,070 | B1 | 3/2003 | Cardwell et al. |
| 6,545,088 | B1 | 4/2003 | Kolthammer et al. |
| 6,566,446 | B1 | 5/2003 | Parikh et al. |
| 6,844,408 | B2 | 1/2005 | Gonioukh et al. |
| 2008/0242809 | A1 | 10/2008 | Neuteboom et al. |
| 2009/0234082 | A1 | 9/2009 | Neilen et al. |
| 2012/0252990 | A1 | 10/2012 | Berbee et al. |
| 2013/0237678 | A1 | 9/2013 | Osby et al. |
| 2013/0295289 | A1 | 11/2013 | Littmann et al. |
| 2014/0288257 | A1 | 9/2014 | Zschoch et al. |
| 2014/0316094 | A1 | 10/2014 | Berbee et al. |
| 2014/0316096 | A1 | 10/2014 | Berbee et al. |
| 2015/0197590 | A1 | 7/2015 | Osby |
| 2016/0102155 | A1 | 4/2016 | Berbee et al. |
| 2016/0297736 | A1 | 10/2016 | Wilczynski et al. |
| 2016/0297904 | A1 | 10/2016 | Berbee et al. |
| 2016/0297905 | A1 | 10/2016 | Berbee et al. |
| 2016/0304643 | A1 | 10/2016 | Eddy et al. |

FOREIGN PATENT DOCUMENTS

| | | | | | |
|---|---|---|---|---|---|
| GB | 1339511 | A | * | 12/1973 | .............. C08F 10/00 |
| WO | 97/45465 | A1 | | 12/1997 | |
| WO | 02/14379 | A1 | | 2/2002 | |
| WO | WO 2012057975 | A1 | * | 5/2012 | ............ C08F 210/02 |
| WO | 2016/209381 | A1 | | 12/2016 | |
| WO | 2016/210075 | A1 | | 12/2016 | |
| WO | 2016/210160 | A1 | | 12/2016 | |
| WO | 2016/210308 | A1 | | 12/2016 | |

OTHER PUBLICATIONS

Williams et al., Polymer Letters, vol. 6, pp. 621-624 (1968).

* cited by examiner

*Primary Examiner* — Robert Jones, Jr.

(74) *Attorney, Agent, or Firm* — Husch Blackwell LLP

(57) ABSTRACT

A composition comprising an ethylene-based polymer, the ethylene-based polymer having the following properties: a) at least one incorporated structure derived from a polyene selected from the group consisting of i) through x), as described herein; and b) a Mw(abs) versus $I_2$ relationship: Mw(abs)<A+B(I2), wherein $A=2.40\times10^5$ g/mole and $B=-8.00\times10^3$ (g/mole)/(dg/min). A composition comprising an ethylene-based polymer, the ethylene-based polymer comprising at least one incorporated structure derived from a polyene selected from the group consisting of i) through x), as described herein, wherein the polymer is formed in a reactor configuration comprising at least one tubular reactor.

20 Claims, 5 Drawing Sheets

ETHYLENE-BASED POLYMERS FORMED USING ASYMMETRICAL POLYENES

REFERENCE TO RELATED APPLICATIONS

The present application claims the benefit of U.S. Provisional Application No. 61/920,916, filed Dec. 26, 2013, and incorporated herein by reference.

BACKGROUND

Conventional low density polyethylene (LDPE) has good processability; however, when used in film and/or extrusion coating application, increased melt strength is still desired.

U.S. Publication No. 2008/0242809 and International Publication Nos. WO 2007/110127, WO97/45465, WO 2012/057975 and WO 2012/084787 describe using various multifunctional components to broaden molecular weight distribution (MWD) and/or modify the rheological properties for making a copolymer suitable for extrusion coating applications, among others. The multifunctional components include, among others, di- and/or higher functional (meth)acrylates, a bifunctional α,ω-alkadienes, diunsaturated comonomers containing divinyl ether and monomeric chain transfer agents (CTAs).

International Application No. PCT/US13/029881 (now WO 2014/03837) discloses an ethylene-based polymer formed from reacting ethylene and at least one asymmetrical polyene comprising an "alpha, beta unsaturated end" and a "C—C double bond end," wherein the reaction takes place in the presence of at least one free-radical initiator.

The impact of above described multifunctional components on the final polymer through coupling and/or branching reactions is complex, and depends on the type and reactivity of the functional groups. A vinyl functional group will act as a comonomer and incorporate into a polymer chain/molecule. When involved, CTA functionality will either start the formation of a new polymer molecule, or initiate, after incorporation of the monomeric group, the formation of a long chain branch (LCB) or T-branch. For a multi- and/or bifunctional component to impact polymer rheology, it is important that (1) at least two functional groups of the component react and (2) effective branches are formed in the polymer.

H-branches are either intermolecular (between two molecules) or intra-molecular (within a molecule) and formed by reaction of two or more vinyl groups of the bi- and/or multifunctional component. The probability that functional groups will react, and contribute to a melt strength increase, depends on the reactivity of the functional groups, overall and remaining conversion level, and molecular topology of the polymer, showing how the component is incorporated by its first reacting functionality. The impact of H-branch formation on melt strength will be (1) negligible with intra-molecular H-branch formation, (2) low for intermolecular H-branch formation between two small polymer molecules, and (3) significant for intermolecular H-branch formation between two larger molecules. However, the latter (3) could lead to the formation of gels, especially when crosslinked networks are formed between and inside large polymer molecules.

Taking into account the reaction kinetic data reported by Ehrlich and Mortimer in Adv. Polymer Sci., Vol 7, pp. 386-448 (1970), and a typical ethylene conversion level in a tubular reactor of 25-35%, the following general remarks can be made: (i) the incorporation level per reactor pass is less than 50% for hydrocarbon dienes, while the probability of forming H-branches is less than 10%; (ii) a monomeric CTA containing acrylate monomer functionality will have a high incorporation level per reactor pass, but further reaction would be required to form a T-branch; and (iii) the probability that the CTA functionality will react, depends on chain transfer activity and remaining conversion level. For compounds with a CTA functionality similar to typically used CTAs for the high pressure LDPE process, the amount of T-branching formed would be low. Di- or higher functional (meth)acrylate components will lead to almost complete incorporation in the polymer, and a very high level of secondary reaction. The high reactivity of the functional groups makes even distribution over the polymer formed in a tubular reactor difficult. Furthermore, coupling or H-branch formation, when the component is fed to the first reaction zone will already occur in the first reaction zone, thus increasing the risk of initiating and/or forming product gels and fouling in the first reaction zone, with further exposure and deterioration in the remaining reaction/cooling zones if present.

Various publications describe methods for modeling and/or simulating polymerizations using branching agents and predicting the properties of resulting polymers. Such publications include, but are not limited to, Liu, J., et al., *Branched Polymer via Free Radical Polymerization of Chain Transfer Monomer: A Theoretical and Experimental Investigation*, J. Polym. Sci. Part A: Polym. Chem., (2007), 46, 1449-59; Wu, P-C et al, *Monte Carlo simulation of structure of Low-Density polyethylene*; Ind. Eng. Chem. Prod. Res. Develop., Vol. 11, No 3, 352-357 (1972); Iedema, P. D. et al., *Rheological Characterization of Computationally Synthesized Reactor Populations of Hyperbranched Macromolecules; Bivarate Seniority-Priority Distribution of IdPE*, Macromolecular Theory and Simulations, 13, 400-418 (2004); T. C. B. McLeish et al, *Molecular rheology of H-Polymers*, Macromolecules, 21, 1062-1070 (1988); and D. J. Read et al, *Linking models of polymerization and dynamics to predict branched polymer structure and flow*; Science, 333, 1871-1874 (2011).

The continuous stirred tank reactor (CSTR), or autoclave, process typically leads to more Cayley tree structured molecular polymer topology, due to the inherent more homogeneous LCB level and chain segment size distribution, while the residence time distribution creates very long and very short growth paths, leading to a broader MWD. Furthermore, a comonomer will be homogenously incorporated within a reaction zone regardless of its reactivity. The tubular reactor process typically leads to more comb-shaped molecular polymer topology, due to the low starting LCB level and the lower temperature conditions leading to long chain segments, while the MWD is narrowed, due to the more homogenous residence time distribution. However, the lack of back mixing, as present in a CSTR reactor, or axial mixing, leads to a comonomer incorporation distribution that is strongly affected by the reactivity of the comonomer and the changing composition of reactants along the tubular reactor. Incorporation in a larger polymer molecule, at a position more inside the polymer molecule sphere (higher priority and seniority in Cayley tree structure), may affect reactivity and increase the probability for an intra-molecular reaction. Incorporation in smaller (lower gyration radius) and/or linear polymer molecules (comb like structure) and/or at a position more at the outer side of the polymer molecule sphere (lower priority and seniority in a Cayley tree structure), may affect the reactivity less, and increase the probability for an intermolecular reaction.

International Publication No. WO 2013/059042 describes using fresh ethylene and/or CTA feed distributions to broaden MWD and increase melt strength, while remaining process conditions are constant. International Publication No. WO 2013/078018 describes low density ethylene-based polymers with broad MWDs and low extractables made in a tubular reactor in the absence of an added crosslinking agent and/or comonomer with crosslinking capability.

International Publication No. WO 2013/078224 describes broad MWD tubular LDPE resins with low extractables. The polymerization conditions need to be carefully selected and balanced to reduce extraction at higher molecular weights. Important process parameters include maximum polymerization temperatures, reactor pressure, and the type, level and distribution of the CTA.

There remains a need for new ethylene-based polymers that have higher melt strengths at high and low densities, and which can be made in a tubular reactor at low gel levels. There is a further need for such polymers that also have lower n-hexane extractable content. These needs have been met by the following invention.

SUMMARY OF THE INVENTION

The invention provides a composition comprising an ethylene-based polymer, wherein the ethylene-based polymer comprises the following properties:

a) at least one incorporated structure derived from a polyene selected from the group consisting of i) through x), as described herein; and b) a Mw(abs) versus melt index ($I_2$) relationship: Mw(abs)<A+B($I_2$), wherein A=$2.40\times10^5$ g/mole and B=$-8.00\times10^3$ (g/mole)/(dg/min).

The invention also provides a composition comprising an ethylene-based polymer, the ethylene-based polymer comprising at least one incorporated structure derived from a polyene selected from the group consisting of i) through x), as described above, wherein the ethylene-based polymer is formed in a reactor configuration comprising at least one tubular reactor.

DETAILED DESCRIPTION

Figure 1:
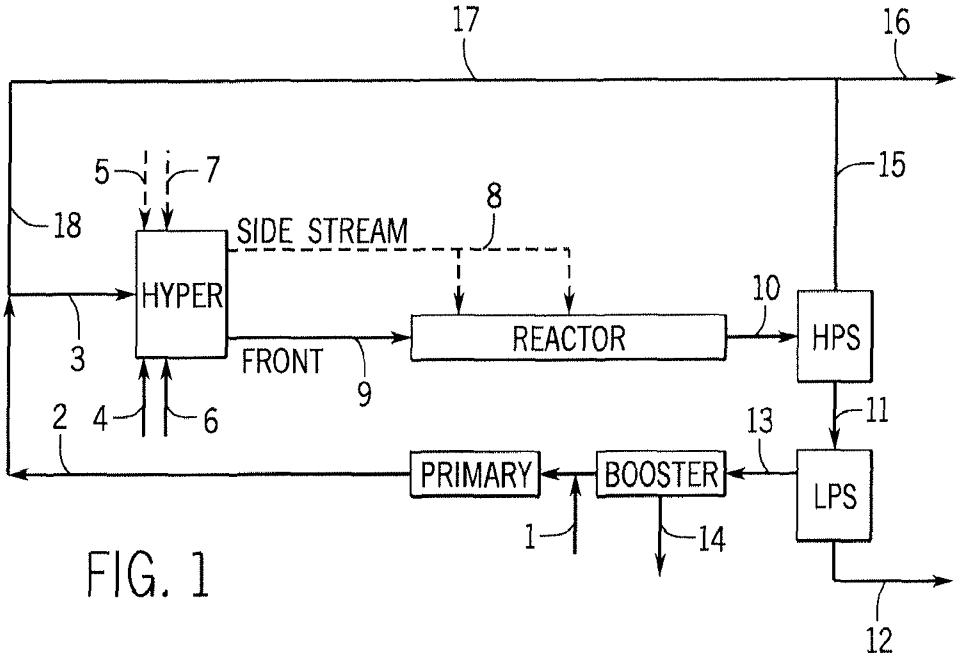
FIG. 1 shows a flow diagram for a LDPE process.

As discussed above, the invention provides a composition comprising an ethylene-based polymer, wherein the ethylene-based polymer comprises the following properties:

a) at least one incorporated structure derived from a polyene selected from the group consisting of i) through x), as described above; and b) a Mw(abs) versus $I_2$ relationship: Mw(abs)<A+B($I_2$), wherein A=$2.40\times10^5$ g/mole and B=$-8.00\times10^3$ (g/mole)/(dg/min).

The invention also provides a composition comprising an ethylene-based polymer, the ethylene-based polymer comprising at least one incorporated structure derived from a polyene selected from the group consisting of i) through x), as described above, wherein the ethylene-based polymer is formed in a reactor configuration comprising at least one tubular reactor.

An inventive ethylene-based polymer may comprise a combination of two or more embodiments described herein.

Polyene

In one embodiment, the inventive ethylene-based polymer comprises at least one incorporated structure derived from a polyene. As used herein, an incorporated structure derived from a polyene refers to at least a portion of a polyene which is structurally incorporated into a polymer during polymerization resulting from polymerizing the ethylene-based polymer in the presence of the polyene.

In one embodiment, the inventive ethylene-based polymer may include at least one incorporated structure derived from two or more polyenes. In other words, the inventive ethylene-based polymer may be polymerized in the presence of two or more polyenes.

In one embodiment, the polyene is an asymmetrical polyene.

In one embodiment, the asymmetrical polyene has an "α,β unsaturated-carbonyl end" comprising an α,β unsaturation and a carboyl group and a "C—C double bond end" comprising carbon-carbon double bond.

In one embodiment, the asymmetrical polyene is present in the reactor in an amount greater than or equal to 100 ppm by weight, based on the total amount by weight of ethylene in the reactor.

In one embodiment, the asymmetrical polyene is selected from the group consisting of the following:

i)

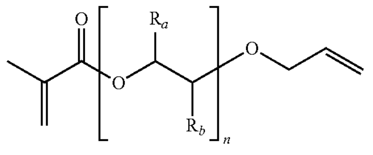

wherein n is from 1 to 50, further from 1 to 20 and further from 1 to 10; $R_a$ is selected from H or an alkyl (preferably ethyl or methyl and more preferably methyl); $R_b$ is selected from H or an alkyl (preferably ethyl or methyl and more preferably methyl); and preferably wherein $R_a$ and $R_b$ are selected from the group consisting of (i) $R_a$ and $R_b$ are both H, (ii) when $R_a$ is methyl, then $R_b$ is H, (iii) when $R_a$ is H, then $R_b$ is methyl, and (iv) a combination of (ii) and (iii);

ii)

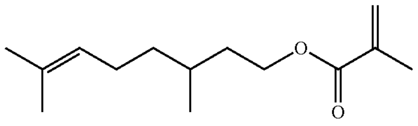

iii)

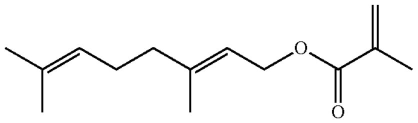

iv)

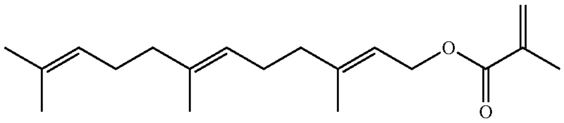

v)

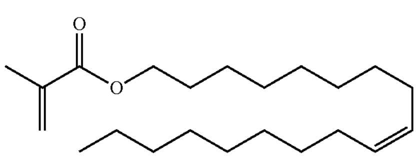

vi)

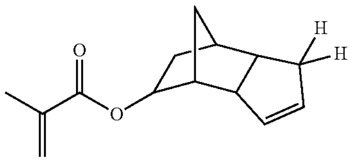

vii)

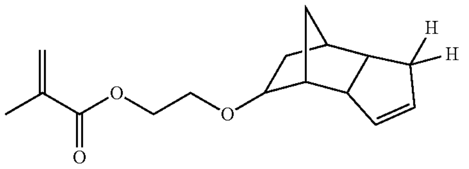

viii)

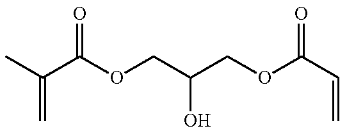

ix)

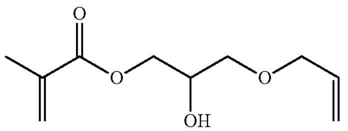

and x)

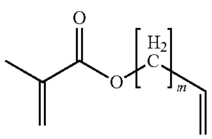

wherein m=1 to 20.

In one embodiment, the asymmetrical polyene is selected from the group consisting of i) through x), each as shown above, and the inventive ethylene-based polymer is formed in a reactor configuration comprising at least one tubular reactor.

In one embodiment, the asymmetrical polyene is selected from the group consisting of i), ii), iii), iv) and v), each as shown above.

In one embodiment, the asymmetrical polyene is selected from the group consisting of i) and v), each as shown above.

In one embodiment, the asymmetrical polyene is selected from the group consisting of vi), vii), viii) and ix), each as shown above.

In one embodiment, the asymmetrical polyene is selected from the group consisting of i), as shown above.

In one embodiment, the asymmetrical polyene is polypropylene glycol allyl ether methacrylate (PPG-AEMA). (See experimental section.)

In one embodiment, the asymmetrical diene has $^1H$ NMR signals from 3.0 to 6.5 ppm chemical shift.

In one embodiment, an inventive polymer is polymerized in the presence of at least two asymmetrical polyenes, and further two asymmetrical dienes, as disclosed herein.

An asymmetrical polyene may comprise a combination of two or more embodiments as described herein.

An asymmetrical diene may comprise a combination of two or more embodiments as described herein.

In one embodiment, the polyene is an asymmetrical diene and incorporated into the inventive ethylene-based polymer at the "α,β unsaturated-carbonyl end."

In one embodiment, the polyene is an asymmetrical diene and incorporated into the inventive ethylene-based polymer at the "C—C double bond end."

In one embodiment, the polyene is an asymmetrical diene incorporated into the inventive ethylene-based polymer at both the "α,β unsaturated-carbonyl end" and the "C—C double bond end."

A polyene may comprise a combination of two or more embodiments as described herein.

Ethylene-Based Polymer

In one embodiment, the ethylene-based polymer is a modified low density polyethylene, comprising, in polymerized form, ethylene, and bonded chemical groups derived from the asymmetrical polyene. In a further embodiment, the modified LDPE comprises less than 2.0 wt %, further less than 1.0 wt %, of other comonomer(s), based on the weight of the modified LDPE.

In one embodiment, the ethylene-based polymer comprises at least one structure selected from the group consisting of the following A through D:

A)

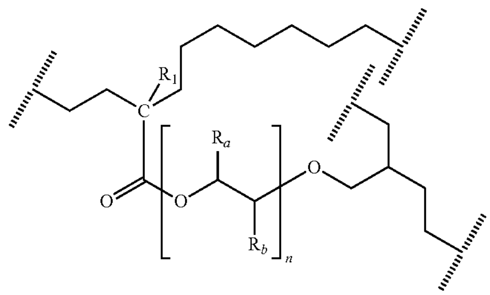

wherein n is from 1 to 50; $R_1$ is selected from H or a $C_1$-$C_6$ alkyl; $R_a$ is selected from H or methyl; $R_b$ is selected from H or methyl; and preferably wherein $R_a$ and $R_b$ are selected from the group consisting of (i) $R_a$ and $R_b$ are both H, (ii) when $R_a$ is methyl, then $R_b$ is H, (iii) when $R_a$ is H, then $R_b$ is methyl, and (iv) a combination of (ii) and (iii);

B)

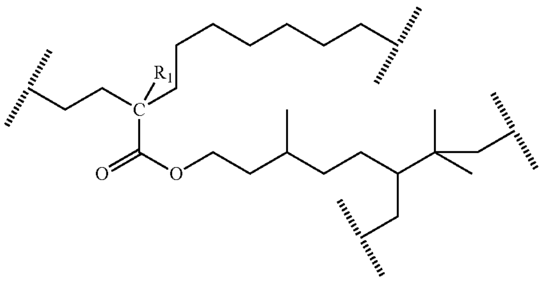

, wherein $R_1$ is selected from H or a $C_1$-$C_6$ alkyl;

C)

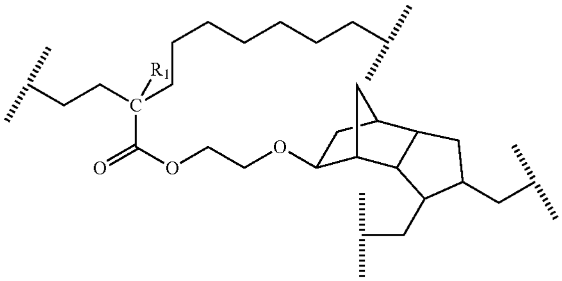

, wherein $R_1$ is selected from H or a $C_1$-$C_6$ alkyl; and

D)

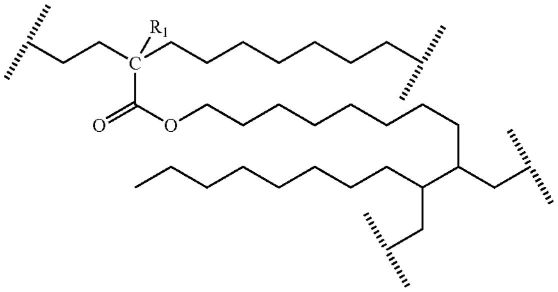

, wherein $R_1$ is selected from H or a $C_1$-$C_6$ alkyl.

In one embodiment, the ethylene-based polymer comprises at least one structure selected from structures A) through C), as shown above.

In one embodiment, the ethylene-based polymer comprises at least one structure selected from structures A) and B), as shown above.

In one embodiment, the ethylene-based polymer comprises at least one structure selected from structure A), as shown above.

In one embodiment, the ethylene-based polymer comprises at least one structure selected from structure B), as shown above.

In one embodiment, the ethylene-based polymer comprises at least one structure selected from structure C), as shown above.

In one embodiment, the ethylene-based polymer comprises at least one structure selected from structure D), as shown above.

In the above structures A)-D), the notation "" represents a break at the center of a covalent carbon-carbon bond in the hydrocarbon backbone of the ethylene-based polymer.

In one embodiment, the ethylene-based polymer comprises, in reacted form, greater than or equal to 0.015 moles of the asymmetrical polyene per 1000 moles of carbon atoms incorporated into the polymer, or, in other words, per 500 moles of ethylene units incorporated into the polymer. In a further embodiment, the asymmetrical polyene is an asymmetrical diene.

In one embodiment, the ethylene-based polymer comprises, in reacted form, less than or equal to 10 moles, or less than or equal to 5 moles, or less than or equal to 2 moles, or less than or equal to 1 mole of asymmetrical polyene per 1000 moles of carbon atoms incorporated into the polymer, or, in other words, per 500 moles of ethylene units incorporated into the polymer. In a further embodiment, the asymmetrical polyene is an asymmetrical diene.

In one embodiment, the ethylene-based polymer comprises, in reacted form, at least 0.03 weight percent of the asymmetrical polyene, based on the weight of the polymer. In a further embodiment, the asymmetrical polyene is an asymmetrical diene as described herein.

In one embodiment, the ethylene-based polymer has a melt index ($I_2$) from 0.1 to 100 g/10 min, or from 0.1 to 50 g/10 min, or from 0.1 to 30 g/10 min. In one embodiment, the ethylene-based polymer has an $I_2$ from 0.3 to 100 g/10 min, or from 0.3 to 50 g/10 min, or from 0.1 to 30 g/10 min, or from 0.3 to 30 g/10 min, or from 0.5 to 30 g/10 min, or from 1.0 to 10 g/10 min. In one embodiment, the ethylene-based polymer has an $I_2$ from 0.3 to 100 g/10 min, or from 1 to 50 g/10 min, or from 2 to 20 g/10 min, or from 2 to 10 g/10 min.

In one embodiment, the ethylene-based polymer has a weight average molecular weight (Mw(abs)) versus $I_2$ relationship meeting the following: $Mw(abs)<A+B(I_2)$, wherein $A=2.40\times10^5$ g/mole and $B=-8.00\times10^3$ (g/mole)/(dg/min).

In one embodiment the ethylene-based polymer has a density greater than or equal to 0.910, or greater than or equal to 0.914, or greater than or equal to 0.916 grams per cubic centimeter (g/cc or g/$cm^3$).

In one embodiment the ethylene-based polymer has a density less than or equal to 0.940, or less than or equal to 0.935, or less than or equal to 0.932, grams per cubic centimeter (g/cc or g/$cm^3$).

In one embodiment the ethylene-based polymer has a density from 0.910 to 0.940. In one embodiment, the ethylene-based polymer has a density from 0.910 to 0.940, or from 0.915 to 0.935, or from 0.916 to 0.932 g/cc.

Preferably, in one embodiment the ethylene-based polymer has a density from 0.912 to 0.940, or from 0.915 to 0.935, or from 0.920 to 0.930, or from 0.918 to 0.926 g/cc.

In one embodiment, the ethylene-based polymer has a density of from 0.916 to 0.940, or from 0.916 to 0.921, or from 0.920 to 0.924, or from 0.923 to 0.940 g/cc.

In one embodiment, the ethylene-based polymer has a density from 0.920 to 0.940 g/cc.

In one embodiment, the ethylene-based polymer has a density greater than, or equal to, 0.921 g/cc, further greater than, or equal to, 0.922 g/cc, further greater than, or equal to, 0.923 g/cc.

In one embodiment, the ethylene-based polymer has a G' value meeting the following relationship:

$$G'\geq C+D\log(I_2),$$

wherein the following parameters have been used: C=162 Pa and D=−90 Pa/log(dg/min).

In one embodiment, the ethylene-based polymer has a melt strength (MS) and $I_2$ having the following relationship:

$$MS \geq E^*[(I_2)^F],$$

wherein the following parameters have been used: E=13.5 $cN/(dg/min)^F$ and F=−0.055.

In one embodiment, the ethylene-based polymer has an n-hexane extractables content of less than 4.0 wt %, or less than or equal to 3.0 wt %, or less than or equal to 2.6 wt %, or less than 2.6 wt % based on the total weight of the polymer.

In one embodiment, the ethylene-based polymer has an n-hexane extractables content of less than 4.0 wt %, wherein the n-hexane extractable content is in weight percent based on the total weight of the polymer.

In one embodiment, the ethylene-based polymer has a density between 0.916 and 0.921 g/cc and an n-hexane extractable content less than 4.0 wt %, preferably less than 3.0 wt %, and more preferably less than 2.6 wt %, based on the total weight of the polymer.

In one embodiment, the ethylene-based polymer has a density between 0.920 and 0.924 g/cc and an n-hexane extractable content less than 4.0 wt %, preferably less than 3.0 wt %, and more preferably less than 2.6 wt %, based on the total weight of the polymer.

In one embodiment, the ethylene-based polymer has a density between 0.923 and 0.940 g/cc and an n-hexane extractable content less than 4.0 wt %, or preferably less than 3.0 wt %, or more preferably less than 2.6 wt %, based on the total weight of the polymer.

In one embodiment, the ethylene-based polymer has a density from 0.912 to 0.940 g/cc. In a further embodiment, the ethylene-based polymer has an n-hexane extractables content of less than 4.0 wt %, based on the total weight of the polymer.

In one embodiment, the ethylene-based polymer has a density from 0.920 to 0.940 g/cc. In a further embodiment, the ethylene-based polymer has an n-hexane extractables content of less than 2.6 wt %, based on the total weight of the polymer.

The invention also provides a composition comprising an inventive ethylene-based polymer, as described herein.

In one embodiment, the composition has a gel index (GI200) of less than 70, or less than or equal to 65, or less than or equal to 10, or less than or equal to 60 $mm^2$ gel per 24.6 $cm^3$ of film.

In one embodiment, the composition has a gel index (GI200) of less than 30, or less than or equal to 20, or less than or equal to 10, or less than or equal to 6 $mm^2$ gel per 24.6 $cm^3$ of film.

In one embodiment, the composition further comprises an ethylene/$\alpha$-olefin interpolymer with a density less than or equal to 0.954 g/cc.

In one embodiment, the composition further comprises another ethylene-based polymer that differs from the inventive ethylene-based polymer in one or more properties, for example, density, $I_2$, weight average molecular weight (Mw (abs)), number average molecular weight (Mn(conv)), or polydispersity index (Mw(abs)/(Mn(conv)).

The invention also provides an article comprising at least one component formed from the inventive composition.

In one embodiment, the article is a film or a coating, for example, an extrusion coating.

In one embodiment, the article is a film. In another embodiment, the article is a coating.

In one embodiment, the article is a coating for a cable or wire. In one embodiment, the cable or wire is an electrical or telecommunications wire or cable.

In one embodiment, the article is a coated sheet, and in a further embodiment the sheet is selected from a metal, a paper, or another polymer substrate or combinations thereof. In a further embodiment, the coated sheet is used in a wire or cable configuration.

In another embodiment, the coated sheet is used in a packaging application.

An inventive ethylene-based polymer may comprise a combination of two or more embodiments as described herein.

An inventive composition may comprise a combination of two or more embodiments as described herein.

An inventive article may comprise a combination of two or more embodiments as described herein.

Process

For producing a highly branched ethylene-based polymer, a high pressure, free-radical initiated polymerization process is typically used. Two different high pressure free-radical initiated polymerization reactor types are known. In the first type, an agitated autoclave vessel having one or more reaction zones is used. The autoclave reactor normally has several injection points for initiator and/or monomer feeds. In the second type, a jacketed tube having one or more reaction zones is used as a reactor. Suitable, but not limiting, reactor lengths may be from 100 to 3600 meters (m), or from 1000 to 2800 m. The beginning of a reaction zone, for either type of reactor, is typically defined by the side injection of initiator of the reaction, ethylene, CTA (or telomer), comonomer(s), and any combination thereof. A high pressure process can be carried out in autoclave or tubular reactors having one or more reaction zones, or in a combination of autoclave and tubular reactors, each comprising one or more reaction zones.

In an embodiment, the inventive process takes place in a reactor configuration comprising at least one autoclave and/or tubular reactor.

In one embodiment, the inventive process takes place in a reactor configuration comprising a tubular reactor.

In one embodiment, the inventive process takes place in a reactor configuration comprising a tubular reactor and an autoclave reactor. In one embodiment, the tubular reactor is downstream from the autoclave reactor.

Often a CTA is used to control molecular weight. In one embodiment, one or more CTAs are added to an inventive polymerization process. CTAs typically comprise at least one of the following groups: alkanes, aldehydes, ketones, alcohol, ether, esters, mercaptan or phosphine. In a further embodiment, a CTA comprises at least one group of an alkane, an unsaturated hydrocarbon, a ketone, an aldehyde, an alcohol or ether. Preferably, a CTA is selected from the group consisting of saturated hydrocarbons, unsaturated hydrocarbons, ketones, aldehydes, alcohols, ethers, esters, mercaptans or phosphines. More preferably, a CTA is selected from the group consisting of saturated hydrocarbons, unsaturated hydrocarbons, ketones, aldehydes, alcohols and ethers. In an embodiment, a CTA is selected from the group consisting of saturated hydrocarbons, ketones, alcohol, ethers, esters, mercaptans and phosphines. Exemplary CTAs include, but are not limited to, propylene, isobutane, n-butane, 1-butene, methyl ethyl ketone, acetone, ethyl acetate, propionaldehyde, ISOPAR-C, -E, and -H (ExxonMobil Chemical Co.), and isopropanol; and further propylene, isobutane, n-butane, and propionaldehyde. In one embodiment, the amount of CTA used is from 0.03 to 10 weight percent based on the weight of the total reaction mixture.

In one embodiment in which CTA is added to the polymerization, the ratio of the concentration of the CTA in the feed to reaction zone i, wherein i≥2 and reaction zone i is downstream from reaction zone 1, to the concentration of the CTA in the feed to reaction zone 1 is greater than or equal to than 1.0, or greater than 1.5, or greater than 2.

In one embodiment in which CTA is added to the polymerization, the ratio of the concentration of the CTA in the feed to reaction zone i, wherein i≥2 and reaction zone i is downstream from reaction zone 1, to the concentration of the CTA in the feed to reaction zone 1 is less than 1.0, or less than 0.8, or less than 0.6, or less than 0.4.

In one embodiment, the process includes a high pressure and low pressure recycle loop to improve ethylene efficiency, since ethylene is only partially converted or consumed per reactor pass. Typically, the conversion level per reactor pass is between 12% and 40%, with the conversion levels for tubular reactors at the higher end of this range and the conversion levels for autoclave reactors at the lower end of this range.

In one embodiment, the polymerization may take place in a tubular reactor as described in International Application No. PCT/US12/059469, filed Oct. 10, 2012. This patent application uses a multi-zone reactor and describes alternate locations of feeding fresh ethylene to control the ethylene to CTA ratio and therefore polymer properties. Fresh ethylene may be simultaneously added in multiple locations to achieve the desired ethylene to CTA ratio. In a similar way, addition of fresh CTA at addition points may be carefully selected to control polymer properties as described in International Application No. PCT/US12/064284, filed Nov. 9, 2012. Fresh CTA may be simultaneously added in multiple locations to achieve the desired CTA to ethylene ratio.

Likewise, the addition points and the amount of the fresh polyene (branching agent), as described in this application, may be controlled to control gels formation, while maximizing the desired property of increased melt strength and performance in targeted applications. In one embodiment, fresh polyene may be simultaneously added in multiple locations to achieve the desired polyene to ethylene ratio (for example, a molar ratio). The use of a polyene (branching and/or coupling agent) to broaden MWD and increase the melt strength of the polymer will put further requirements on the distribution of the CTA and the polyene along a reactor system in order to achieve the desired change in product properties without or minimizing potential negative impacts like gel formation, reactor fouling, process instabilities, low efficiency of polyene, etc.

In one embodiment, the polymerization takes place in at least one tubular reactor. In a multi-reactor system, the autoclave reactor usually precedes the tubular reactor. The addition points and amounts of fresh ethylene, fresh CTA, and fresh polyene may be appropriately controlled to achieve the desired ratios of CTA to ethylene and polyene to ethylene in the feeds to and/or in the reaction zones.

In one embodiment, the polyene (branching agent) is an asymmetrical diene as described herein and added to the polymerization in an amount from 0.002 to 0.300 mole percent (mol %), or from 0.005 to 0.300 mol %, based on the total moles of ethylene and asymmetrical diene added to the polymerization.

In one embodiment, the polymerization takes place in two reactors. In one embodiment, the polymerization takes place in one reactor with multiple or at least two reaction zones.

In one embodiment, the polymerization takes place in a reactor configuration comprising at least two reaction zones, reaction zone 1 and reaction zone i (i≥2) and wherein reaction zone i is downstream from reaction zone 1. In an embodiment, i is from 2-6, or from 2-5, or from 2-4. In an embodiment, i=2.

In one embodiment, the total number of reaction zones=n. In a further embodiment, n is from 1 to 20, further from 1 to 10, and further from 1 to 6.

In a further embodiment, n is from 2 to 20, further from 2 to 10, and further from 2 to 6.

In one embodiment, more polyene, by mass, is added to reaction zone i as compared to the amount of polyene, by mass, added to reaction zone 1. In another embodiment, more polyene, by mass, is added to reaction zone 1 as compared to the amount of polyene added to reaction zone i. As used above, the amount of polyene is determined based on the polyene added to a reaction zone in a fresh feed (i.e., not carry-over polyene).

In one embodiment, a greater concentration of polyene is added to reaction zone i as compared to the concentration of polyene added to reaction zone 1. In another embodiment, a greater concentration of polyene is added to reaction zone 1 as compared to the concentration of polyene added to reaction zone i.

In one embodiment, polyene is added to both reaction zone 1 and reaction zone i.

In one embodiment, no polyene is added to reaction zone 1.

Depending on the reactivity ratios of the polyene and distribution of polyene between reaction zones, the amount of polyene incorporated into the ethylene-based polymer in each reaction zone, and which end of the polyene (i.e., "α,β unsaturated-carbonyl end" or "C—C double bond end") incorporates into the ethylene-based polymer, may vary.

In one embodiment, the ratio of the concentration of the polyene incorporated into the locally-formed polymer of reaction zone 1 to the concentration of polyene incorporated into the locally-formed polymer of reaction zone i (i≥2, or from 2 to 5, or from 2 to 4, or equal to 2) is less than or equal to 1, or less than 1, or less than or equal to 0.75, or less than or equal to 0.5.

In one embodiment, the ratio of the concentration of the polyene incorporated into the locally-formed polymer of reaction zone 1 to the concentration of polyene incorporated into the locally-formed polymer of reaction zone 2 (i=2) is less than or equal to 1, or less than 1, or less than or equal to 0.75, or less than or equal to 0.5. In a further embodiment, a majority amount of polyene incorporated into the ethylene-based polymer is incorporated through the "α,β unsaturated-carbonyl end."

In one embodiment, the ratio of the concentration of the polyene incorporated into the locally-formed polymer of reaction zone 1 to the concentration of polyene incorporated into the locally-formed polymer of reaction zone i+1 is less than 1, or less than 1, or less than or equal to 0.75, or less than or equal to 0.5.

In one embodiment, the ratio of the concentration of the polyene incorporated into the locally-formed polymer of reaction zone 1 to the concentration of polyene incorporated into the locally-formed polymer of reaction zone i (i=2 to n−1, wherein n is the total number of reaction zones) is less than or equal to 1, or less than 1, or less than or equal to 0.75, or less than or equal to 0.5, and the ratio of the concentration of the polyene incorporated into the locally-formed polymer of reaction zone 1 to the concentration of polyene incorporated into the locally-formed polymer of reaction zone i+1 is less than 1, or less than 1, or less than or equal to 0.75, or less than or equal to 0.5. In a further embodiment, a majority amount of polyene incorporated into the ethylene-based polymer is incorporated through the "α,β unsaturated-carbonyl end."

In one embodiment, the ratio of the concentration of the polyene incorporated into the locally-formed polymer of reaction zone i+1 (i is from 2 to n−1 and n is the total number of reaction zones) to the concentration of the polyene incorporated into the locally-formed polymer of reaction zone 2 is less than or equal to 1, or less than 1, or less than or equal to 0.7, or less than or equal to 0.5. In a further embodiment, a majority amount of polyene incorporated into the ethylene-based polymer is incorporated through the "α,β unsaturated-carbonyl end."

In an embodiment, the concentration of polyene in the total ethylene feed to the reactor is less than 0.2 mole percent, or less than 0.1 mole percent, or less than 0.05 mole percent, or less than 0.025 mole percent based on the total moles of ethylene fed to the reactor.

In one embodiment, the ethylene fed to the first reaction zone is at least 10 percent of the total ethylene fed to the polymerization. In one embodiment, the ethylene fed to the first reaction zone is from 10 to 100 percent, or from 20 to 80 percent, or from 25 to 75 percent, or from 30 to 70 percent, or from 40 to 60 percent of the total ethylene fed to the polymerization.

In one embodiment, the ethylene-based polymer comprises ethylene and one or more comonomers, and preferably one comonomer. Comonomers include, but are not limited to, α-olefins, acrylates, methacrylates and anhydrides, each typically having no more than 20 carbon atoms. The α-olefin comonomers, which have a combined monomer and CTA functionality, may have 3 to 10 carbon atoms, or in the alternative, the α-olefin comonomers may have 3 to 8 carbon atoms. Exemplary α-olefin comonomers include, but are not limited to, propylene, 1 butene, 1-pentene, 1-hexene, 1-heptene, 1-octene, 1-nonene, 1-decene, and 4 methyl-1-pentene and combinations thereof. Preferably, the α-olefin comonomers are selected from propylene, 1-butene and combinations thereof.

In one embodiment, the ethylene-based polymer comprises ethylene and at least one asymmetrical polyene as the only monomeric units.

Free radical initiators are generally used to produce the inventive ethylene-based polymers. A free radical initiator, as used herein, refers to a free radical generated by chemical and/or radiation means. Exemplary free radical initiators include organic peroxides including, but not limited to, cyclic peroxides, diacyl peroxides, dialkyl peroxides, hydroperoxides, peroxycarbonates, peroxydicarbonates, peroxyesters, and peroxyketals. Preferred initiators are t-butyl peroxy pivalate, di-t-butyl peroxide, t-butyl peroxy acetate and t-butyl peroxy-2-hexanoate, or mixtures thereof. In one embodiment, these organic peroxide initiators are used in an amount from 0.001-0.2 wt %, based upon the weight of polymerizable monomers.

In one embodiment, an initiator is added to at least one reaction zone and the initiator has a half-life temperature at one second greater than 255° C., preferably greater than 260° C. In a further embodiment, such initiators are used at a peak polymerization temperature from 320° C. to 350° C. In a further embodiment, the initiator comprises at least one peroxide group incorporated in a ring structure. Examples of such initiators include, but are not limited to, TRIGONOX 301 (3,6,9-triethyl-3,6,9-trimethyl-1,4,7-triperoxonaan) and TRIGONOX 311 (3,3,5,7,7-pentamethyl-1,2,4-trioxepane), both available from Akzo Nobel, and HMCH-4-AL (3,3,6,6,9,9-hexamethyl-1,2,4,5-tetroxonane) available from United Initiators. See also International Publication Nos. WO 02/14379 and WO 01/68723.

In one embodiment, for the polymerization process described herein, the maximum (or peak) temperature for each reaction zone is from 150° C. to 360° C., or from 170° C. to 350° C., or from 200° C. to 340° C.

In one embodiment, the polymerization pressure as measured at the first inlet of the reactor is from 1000 bar to 3600 bar, or from 1200 bar to 3500 bar, or from 1500 to 3400 bar, or from 2000 to 3200 bar.

In one embodiment, the polyene is subject to an "oxygen removal step" prior to being fed to a reaction zone.

In one embodiment, the polyene is stored in a feed vessel, and wherein the feed vessel has a "head-space gas" comprising less than 5.0 volume percent oxygen.

A process for forming an ethylene-based polymer may comprise a combination of two or more embodiments as described herein.

Additives

An inventive composition may comprise one or more additives. Additives include, but are not limited to, stabilizers, plasticizers, antistatic agents, pigments, dyes, nucleating agents, fillers, slip agents, fire retardants, processing aids, smoke inhibitors, viscosity control agents and anti-blocking agents. The polymer composition may, for example, comprise less than 10% of the combined weight of one or more additives, based on the weight of the inventive polymer.

In one embodiment the polymers of this invention are treated with one or more stabilizers, for example, antioxidants, such as IRGANOX 1010, IRGANOX 1076 and IRGAFOS 168. In general, the polymers are treated with one or more stabilizers before extrusion or other melt processes.

An inventive composition may further comprise at least one other polymer, in addition to an inventive ethylene-based polymer. Blends and mixtures of the inventive polymer with other polymers may be prepared. Suitable polymers for blending with the inventive polymers include natural and synthetic polymers. Exemplary polymers for blending include propylene-based polymers (both impact modifying polypropylene, isotactic polypropylene, atactic polypropylene, and random propylene/ethylene copolymers), various types of ethylene-based polymers, including high-pressure, free-radical LDPE, heterogeneously branched LLDPE (typically via Ziegler-Natta catalysis), homogeneously branched linear or substantially linear PE (typically via single-site, including metallocene catalysis), including multiple reactor PE ("in-reactor" compositions of heterogeneously branched PE and homogeneously branched PE, such as products disclosed in U.S. Pat. No. 6,545,088 (Kolthammer et al.); U.S. Pat. No. 6,538,070 (Cardwell, et al.); U.S. Pat. No. 6,566,446 (Parikh, et al.); U.S. Pat. No. 5,844,045 (Kolthammer et al.); U.S. Pat. No. 5,869,575 (Kolthammer et al.); and U.S. Pat. No. 6,448,341 (Kolthammer et al.)), ethylene-vinyl acetate (EVA), ethylene/vinyl alcohol copolymers, polystyrene, impact modified polystyrene, ABS, styrene/butadiene block copolymers and hydrogenated derivatives thereof (SBS and SEBS), and thermoplastic polyurethanes. Other ethylene-based polymers include homogeneous polymers, such as olefin plastomers and elastomers (for example, polymers available under the trade designations AFFINITY Plastomers and ENGAGE Elastomers (The Dow Chemical Company) and EXACT (ExxonMobil Chemical Co.)). Propylene-based copolymers (for example, polymers available under the trade designation VERSIFY Plastomers & Elastomers (The Dow Chemical Company) and VISTAMAXX (ExxonMobil Chemical Co.) can also be useful as components in blends comprising an inventive polymer.

Applications

The polymers, polymer blends and compositions of this invention may be employed in a variety of conventional thermoplastic fabrication processes to produce useful articles, including extrusion coatings onto various substrates (for example, paper, cardboard, a metal); monolayer and multilayer films; molded articles, such as blow molded, injection molded, or rotomolded articles; coatings; fibers; and woven or non-woven fabrics.

An inventive polymer may be used in a variety of films, including but not limited to, clarity shrink films, collation shrink films, cast stretch films, silage films, stretch hood, sealants, and diaper backsheets.

Other suitable applications include, but are not limited to, wires and cables, gaskets and profiles, adhesives; footwear components, and auto interior parts.

Definitions

Unless stated to the contrary, implicit from the context, or customary in the art, all parts and percents are based on weight, and all test methods are current as of the filing date of this application.

The term "composition," as used herein, includes a mixture of materials which comprise the composition, as well as reaction products and decomposition products formed from the materials of the composition.

The terms "blend" or "polymer blend," as used, refers to a mixture of two or more polymers. A blend may or may not be miscible (not phase separated at molecular level). A blend may or may not be phase separated. A blend may or may not contain one or more domain configurations, as determined from transmission electron spectroscopy, light scattering, x-ray scattering, and other methods known in the art. The blend may be effected by physically mixing the two or more polymers on the macro level (for example, melt blending resins or compounding), or the micro level (for example, simultaneous forming within the same reactor).

The term "polymer" refers to a compound prepared by polymerizing monomers, whether of the same or a different type. The generic term polymer thus embraces the term homopolymer (which refers to polymers prepared from only one type of monomer with the understanding that trace amounts of impurities can be incorporated into the polymer structure), and the term "interpolymer" as defined below. Trace amounts of impurities may be incorporated into and/or within the polymer.

The term "interpolymer" refers to polymers prepared by the polymerization of at least two different types of monomers. The generic term interpolymer includes copolymers (which refers to polymers prepared from two different monomers), and polymers prepared from more than two different types of monomers.

The term "ethylene-based polymer" refers to a polymer that comprises a majority amount of polymerized ethylene, based on the weight of the polymer, and, optionally, at least one comonomer.

The term "ethylene-based interpolymer" refers to an interpolymer that comprises a majority amount of polymerized ethylene, based on the weight of the interpolymer, and at least one comonomer.

The term "ethylene-based copolymer" refers to a copolymer that comprises a majority amount of polymerized ethylene, based on the weight of the interpolymer, and a comonomer as the only monomer types.

The term "propylene-based polymer" refers to a polymer that comprises a majority amount of polymerized propylene, based on the weight of the polymer, and, optionally, at least one comonomer.

The term "polyene," as used herein, refers to a polyunsaturated compound having two or more carbon-carbon double bonds.

The terms "rheology modifier" or "rheology modifying agent," as used herein, refer to the polyenes, as described herein, which are able to change the rheology of the polymer, for example, increase G' and melt strength, when incorporated into the polymer.

The term "alkyl," as used herein, refers to a saturated linear, cyclic, or branched hydrocarbon group. Nonlimiting examples of suitable alkyl groups include, for example, methyl, ethyl, n-propyl, i-propyl, n-butyl, t-butyl, i-butyl (or 2-methylpropyl), etc. In one embodiment, the alkyls have 1 to 20 carbon atoms.

The term "high pressure polymerization process," as used herein, refers to a free radical polymerization process carried out at an elevated pressure of at least 1000 bar (100 MPa).

The term "make-up," when used herein in reference to a reactant (i.e., "make-up ethylene," "make-up CTA," "make-up polyene," etc.), refers to the feed stream of the reactant needed to compensate for the converted and/or lost reactant in the high polymerization process.

The term "fresh," when used herein in reference to a reactant (i.e., "fresh ethylene," "fresh polyene"), refers to reactant provided from an external source(s) and not provided internally from a recycled source(s). For example, in an embodiment, fresh ethylene is used as "make-up ethylene" required to compensate for the ethylene consumed by the polymerization and/or lost through, for example, purge from the process and residual ethylene in the polymer.

The Booster compressor (Booster) is a device that compresses the following: a) the low pressure recycle coming from the LPS (Low pressure Separator), and b) optionally, the recycled compressor packing leaks, each to the pressure level required at the inlet side of the Primary compressor. This compression can take place in one or multiple compression stages, and can be combined with intermediate cooling. A Booster can consist of single or multiple compressor frames, and can be potentially combined with Primary compressor frame(s).

The Primary compressor (Primary) is a device that compresses the following: a) the fresh incoming ethylene, and/or b) the low pressure recycle coming from the Booster, and/or c) the recycled compressor packing leaks, each to the pressure level required at the inlet side of the Hyper compressor. This compression can take place in one or multiple compression stages, and can be combined with intermediate cooling. The Primary can consist of single or multiple compressor frames, and can be potentially combined with Booster compressor frame(s).

Hyper compressor (Hyper), or Secondary compressor, is a device that compresses the following: a) the ethylene coming from the HPR (High Pressure Recycle), and/or b) the Primary, each to a pressure level required to feed the reactor at its inlet pressure set point. This compression can take place in one or multiple compression stages, and can be combined with intermediate cooling. The Hyper comprises a plunger reciprocating compressor, and can consist of single or multiple compressor frame(s).

The notation "DP" is degree of polymerization, see references Ehrlich et al and Goto et al. The DP is the ratio between the rate of propagation divided by the sum of the rates of all other molecular growth termination events. The sum does not include the rate of transfer to polymer (LCB). The DP reflects the number of monomer units incorporated per molecule formed. Due to the LCB mechanism, the DP along the reactor will not reflect the molecular weight of new polymer molecules, since, due to LCB, considerable part of the polymer growth will be added to existing molecules.

The notation "½DP" reflects the number of molecules formed per 500 ethylene molecules or 1000 carbon atoms incorporated in the formed polymer.

The term "LCB frequency," as used herein, refers to the number of long chain branches formed per 500 ethylene molecules or 1000 carbon atoms incorporated in the formed polymer.

The term "SCB frequency," as used herein, reflects the number of short chain branches formed per 500 ethylene molecules or 1000 carbon atoms incorporated in the formed polymer.

The term "locally-formed polymer," as used herein, refers to a polymer product produced in a given reaction location, for example, a given reaction zone. The locally-formed polymer may consist of new polymer molecules or new polymer added as long chain branches to already formed polymer molecules.

The terms "comprising," "including," "having," and their derivatives, are not intended to exclude the presence of any additional component, step or procedure, whether or not the same is specifically disclosed. In order to avoid any doubt, all compositions claimed through use of the term "comprising" may include any additional additive, adjuvant, or compound, whether polymeric or otherwise, unless stated to the contrary. In contrast, the term, "consisting essentially of" excludes from the scope of any succeeding recitation any other component, step, or procedure, excepting those that are not essential to operability. The term "consisting of" excludes any component, step, or procedure not specifically delineated or listed.

Test Methods

Density—

Samples that were measured for density were prepared according to ASTM D4703: Annex A: Method C. Samples were pressed at 190° C. and 3,000 psi for five minutes, 15 tons for two minutes, and then cooled, under pressure, at 15° C./min. Density measurements were made after conditioning at 23° C. and 50% R.H. for 40 hours, prior to testing, using ASTM D792 Method B.

Melt Index—

Melt index, or $I_2$, was measured in accordance by ASTM D 1238, Condition 190° C./2.16 kg, and was reported in grams eluted per 10 minutes. The $I_{10}$ was measured in accordance with ASTM D 1238, Condition 190° C./10 kg, and was reported in grams eluted per 10 minutes.

GPC Method: Triple Detector Gel Permeation Chromatography (TDGPC)~Conventional GPC Data—

A Triple Detector Gel Permeation Chromatography (3D-GPC or TDGPC) system consisting of a Polymer Laboratories (now Agilent) high temperature chromatograph Model 220, equipped with a 2-angle laser light scattering (LS) detector Model 2040 (Precision Detectors, now Agilent), an IR-4 infra-red detector from Polymer Char (Valencia, Spain), and a 4-capillary solution viscometer (DP) (Visotek, now Malvern) is used. Data collection is performed using Polymer Char DM 100 data acquisition box and related software (Valencia, Spain). The system is also equipped with an online solvent degassing device from Polymer Laboratories (now Agilent).

High temperature GPC columns consisting of four 30 cm, 20 um mixed A LS columns from Polymer Laboratories (now Agilent) are used. The sample carousel compartment is operated at 140° C., and the column compartment is operated at 150° C. The samples are prepared at a concentration of 0.1 grams of polymer in 50 milliliters of solvent. The chromatographic solvent and the sample preparation solvent is 1,2,4-trichlorobenzene (TCB) containing 200 ppm of 2,6-di-tert-butyl-4methylphenol (BHT). The solvent is sparged with nitrogen. The polymer samples are gently stirred at 160° C. for four hours. The injection volume is 200 microliters. The flow rate through the GPC is set at 1.0 ml/minute.

Column calibration and sample molecular weight calculations are performed using Polymer Char "GPC One" software. Calibration of the GPC columns is performed with 21 narrow molecular weight distribution polystyrene standards. The molecular weights of the polystyrene standards range from 580 to 8,400,000 g/mol, and are arranged in 6 "cocktail" mixtures, with at least a decade of separation between the individual molecular weights.

The peak molecular weights of polystyrene standards are converted to polyethylene molecular weights using the following equation (as described in Williams and Ward, J. Polym. Sci., Polym. Let., 6, 621 (1968)): $M_{polyethylene}=A(M_{polystyrene})^B$. Here, B has a value of 1.0, and the experimentally determined value of A is around 0.38 to 0.44.

The column calibration curve is obtained by fitting a first order polynomial to the respective polyethylene-equivalent calibration points, obtained from the above Equation to the observed elution volumes.

The conventional number and weight-average molecular weights (Mn(conv) and Mw(conv), respectively) are calculated according to the following equations:

$$\overline{Mn} = \frac{\sum^{i} Wf_i}{\sum^{i} (Wf_i / M_i)}$$

$$\overline{Mw} = \frac{\sum^{i} (Wf_i * M_i)}{\sum^{i} Wf_i}$$

where, $Wf_i$ is the weight fraction of the i-th component and $M_i$ is the molecular weight of the i-th component. The molecular weight distribution (MWD) is expressed as the ratio of the weight average molecular weight (Mw) to the number average molecular weight (Mn).

The A value is determined by adjusting the A value in the Williams and Ward Equation, until Mw, the weight average molecular weight, calculated using the above Equation, and the corresponding retention volume polynomial, agreed with the independently determined value of Mw, obtained in accordance with a linear polyethylene homopolymer reference, with known absolute weight-average molecular weight of 115,000 g/mol as measured by LALLS, in a manner traceable to standard homopolymer polyethylene NBS1475.

The absolute weight average molecular weight (Mw(abs)) are characterized by the LS detector and IR-4 concentration detector using the following equation:

$$Mw(\text{abs}) = K_{LS} * \frac{\sum(LS_i)}{\sum(IR_i)},$$

wherein $\Sigma(LS_i)$ is the response area of the LS detector, $\Sigma(IR_i)$ is the response area of the IR-4 detector, and $K_{LS}$ is the instrument constant, which is determined using a standard NIST 1475 with known concentration and certificated value for the weight average molecular weight of 52,000 g/mol.

The absolute molecular weight at each elution volume is calculated using the following equation:

$$M_{LS,i} = K_{LS} * \frac{LS_i}{IR_i},$$

wherein $K_{LS}$ is the determined instrument constant, $LS_i$ and $IR_i$ are the LS and IR detector responses, respectively, of the same i-th elution component.

The absolute number average and zeta average molecular weight are calculated with the following equations:

$$Mn(\text{abs}) = K_{LS}\frac{\sum(IR_i)}{\sum(IR_i)/\left(\frac{LS_i}{IR_i}\right)},$$

$$Mz(\text{abs}) = K_{LS}\frac{\sum IR_i * \left(\frac{LS_i}{IR_i}\right)^2}{\sum IR_i * \left(\frac{LS_i}{IR_i}\right)}.$$

A linear extrapolation was performed on log $M_{LS,\,i}$—elution volume plot when the log $M_{LS,\,i}$ data scattered, caused by low LS or IR detector responses.

Standard Method for Hexane Extractables—

Polymer pellets (from the polymerization pelletization process, without further modification; approximately 2.2 grams per press) are pressed in a Carver Press at a thickness of 3.0-4.0 mils. The pellets are pressed at 190° C. for three minutes at 40,000 $Ib_f$. Non-residue gloves (PIP*CleanTeam*CottonLisle Inspection Gloves, Part Number: 97-501) are worn so as to not contaminate the films with residual oils from the hands of the operator. Films are cut into "1-inch by 1-inch" squares, and weighed (2.5±0.05 g). The films are then extracted for two hours in a hexane vessel containing about 1000 ml of hexane, at 49.5±0.5° C., in a heated water bath. The hexane used is an isomeric "hexanes" mixture (for example, Hexanes (Optima), Fisher Chemical, high purity mobile phase for HPLC and/or extraction solvent for GC applications). After two hours, the films are removed, rinsed in clean hexane, and dried in a vacuum oven (80±5° C.) at full vacuum (ISOTEMP Vacuum Oven, Model 281A, at approximately 30 inches Hg) for two hours. The films are then place in a desiccators, and allowed to cool to room temperature for a minimum of one hour. The films are then reweighed, and the amount of mass loss due to extraction in hexane is calculated. This method is based on 21 CRF 177.1520 (d)(3)(ii), with one deviation from FDA protocol by using hexanes instead of n-hexane.

Method for Collection of Soluble Fraction of Hexane Extractables for GPC and Nuclear Magnetic Resonance (NMR)—

The above method for standard hexane extractables is used. For analytical calculations and soluble fraction preparation for GPC testing, 2.5 g of film is used as described above. For soluble fraction preparation for NMR, 7.5 g of film is used.

The remaining hexane, including hexane used for rinse, is reduced down to collect the soluble fraction. Distillation, rotovapping or other equivalent techniques for removing solvent can be used. The hexane is reduced down until 100-150 milliliters of solution remained. The remaining hexane is then transferred to a pre-weighed evaporation dish. The evaporation dish is heated slightly under nitrogen until dry. Once evaporated to dryness, the dish is transferred to a room temperature vacuum oven for at least 12 hours. The weight of the residue is calculated to determine the weight percent hexane extractables. The remaining residue is analyzed by GPC and NMR.

Rheological G'—

The sample used in the G' measurement is prepared from a compression molding plaque. A piece of aluminum foil is placed on a back plate, and a template or mold is placed on top of the back plate. Approximately 12 grams of resin is placed in the mold, and a second piece of aluminum foil is placed over the resin and mold. A second back plate is then placed on top of the aluminum foil. The total ensemble is put into a compression molding press run at the following conditions: 3 min at 150° C. and 10 bar, followed by 1 min at 150° C. and 150 bar, followed by a "1.5 min" quench cooling to room temperature at 150 bar. A 25 mm disk is stamped out of the compression-molded plaque. The thickness of the disk is approximately 2.0 mm.

The rheology measurement to determine G' is done in a nitrogen environment at 170° C. and a strain of 10%. The stamped-out disk is placed between the two "25 mm" parallel plates located in an ARES-1 (Rheometrics SC) rheometer oven, which is preheated for at least 30 minutes at 170° C., and the gap of the "25 mm" parallel plates is slowly reduced to 1.65 mm. The sample is then allowed to remain for exactly 5 minutes at these conditions. The oven is then opened, the excess sample is carefully trimmed around the edge of the plates, and the oven is closed. The storage modulus (G') and loss modulus (G") of the sample are measured via a small amplitude, oscillatory shear according to a decreasing frequency sweep form 100 to 0.1 rad/s (when able to obtain a G" value lower than 500 Pa at 0.1 rad/s), or from 100 to 0.01 rad/s. For each frequency sweep, 1-points (logarithmically spaced) per frequency decade are used.

The data are plotted (G' (Y-axis) versus G" (X-axis)) on a log-log scale. The Y-axis scale covers the range from 10 to 1000 Pa, while the X-axis scale covers the range from 100 to 1000 Pa. The Orchestrator software is used to select the data in the region where G" is between 200 and 800 Pa (or using at least 4 data points). The data are fit to a log polynomial model using the fit equation Y=C1+C2 ln(x). Using the Orchestrator software, G' at G" equal to 500 Pa is determined by interpolation.

Melt Strength—

Melt strength measurements are conducted on a Gottfert Rheotens 71.97 (Göettfert Inc.; Rock Hill, S.C.) attached to a Gottfert Rheotester 2000 capillary rheometer. A polymer melt is extruded through a capillary die with a flat entrance angle (180 degrees), with a capillary diameter of 2.0 mm, and an aspect ratio (capillary length/capillary diameter) of 15.

After equilibrating the samples at 190° C. for 10 minutes, the piston is run at a constant piston speed of 0.265 mm/second. The standard test temperature is 190° C. The sample is drawn uniaxially to a set of accelerating nips, located 100 mm below the die, with an acceleration of 2.4 mm/sec$^2$. The tensile force is recorded as a function of the take-up speed of the nip rolls. Melt strength is reported, as the plateau force (cN), before the strand breaks. The following conditions are used in the melt strength measurements: plunger speed=0.265 mm/sec; wheel acceleration=2.4 mm/sec$^2$; capillary diameter=2.0 mm; capillary length=30 mm; and barrel diameter=12 mm.

Gel Content Measurement—

1. Apparatus: The apparatus consists of a 4-zone laboratory extruder, Model OCS ME 20, with a "150 mm ribbon die (cast film die)," a CR-8 winding unit, an air knife, and an FS-3 line scan camera (50 micron resolution; available from OCS Optical Control Systems GmbH Hullener Feld 36, 58454 Witten, Germany, or an equivalent).

2. Material-specific settings for film-manufacturing: The temperature setting for the heating zones at cylinder and die is determined for an ethylene-based polymer according to MFR-ranges in two groups, as follows:

Group 1: MFR-range 1.5-3 g/10 min (190° C./2.16 kg), temperatures: 160 (first zone)/180/180/180/180° C. (die).

Group 2: MFR-range 3-6 g/10 min (190° C./2.16 kg), temperatures: 150/150/150/150/150° C.

Preset Parameters: Rotational speed (screw): 70 rpm; Haul-off speed: 4 m/min; the cast film thickness is 76 μm±5 μm.

3. Measurement: One analysis inspects 50 parcels, where a parcel is defined as "24.6 cm$^3$" volume of film which corresponds to a "0.324 m$^2$" surface area for a film thickness of 76 μm.

4. Analysis: GI200=the average sum of 50 parcels of "the areas of all gels greater than 200 μm in diameter in each parcel." Diameter of gel is determined as the diameter of a circle having equivalent area.

EXPERIMENTAL

Polymerization Simulations

A polymerization simulation model with applied reaction scheme and kinetics is described by Goto et al., as discussed below. Other reactor and product modeling frameworks are available through ASPENTECH and PREDICI of Dr. Wulkow Computing in Technology GmbH (CiT), Rastede, Germany. Process and product responses predicted by these model frameworks are determined by the reactor parameters and the applied reaction scheme and kinetic parameters. The applied reaction scheme and kinetic parameters are described below.

The polymerization simulations are achieved with Goto LDPE simulation model as described in: S. Goto et al; *Journal of Applied Polymer Science: Applied Polymer Symposium,* 36, 21-40, 1981 (Title: *Computer model for commercial high pressure polyethylene reactor based on elementary reaction rates obtained experimentally*).

The kinetic data used by Goto et al. is derived from high pressure free radical polyethylene polymerization experiments performed at varying temperatures, pressures and polymer concentrations, as described in the following: K. Yamamoto, M. Sugimoto; *Rate constant for long chain-chain branch formation in free-radical polymerization of ethylene; J. Macromol. Science-Chem.*, A13 (8), pp. 1067-1080 (1979). The following elementary reaction steps are described by Goto et al.: i) propagation of ethylene, ii) termination of radicals, iii) backbiting or short chain branching (SCB) formation, iv) transfer to polymer or LCB formation, v) beta elimination of secondary radicals leading to vinyl formation, and vi) beta elimination of tertiary radicals leading to vinylidene formation.

See Table 1 for kinetic data, where ko is the pre-exponential or frequency factor; Ea is the activation energy, reflecting the temperature dependence; and ΔV is the activation volume, reflecting the pressure dependence. All kinetic constants are from Goto et al., except the ko, Ea and ΔV values for backbiting, which have been optimized to better reflect the level of methyl branches (as analyzed by C13 NMR technique), in high pressure polyethylene as function of pressure and temperature conditions.

TABLE 1

Kinetic constants for main reactions

| Reaction<br>Units | ko<br>m3/hr/kmol | Ea<br>cal/mol | ΔV<br>cc/mol |
|---|---|---|---|
| Propagation | 5.63E+11 | 10520 | −19.7 |
| Termination | 3E+11 | 3000 | 13 |
| Backbiting | 2.6E+12 | 12130 | −14 |
| Transfer to Polymer | 1.75E+12 | 14080 | 4.4 |
| Beta Elimination of sec rad | 5.82E+11 | 15760 | −22.6 |
| Beta Elimination of tert rad | 8.51E+10 | 14530 | −19.7 |

The kinetic data for selected CTAs are given in Table 2. The kinetic constants have been calculated with the help of the kinetic constants on the Cs-value (ks/kp) as determined by Mortimer (see references at page 29) and the ethylene propagation kinetics as given by Goto et al. (see Table 1).

The polyenes have been described, and modeled, through assigning kinetic $r_1$ and $r_2$ reactivity ratios (see Tables 2 and 3 below). The kinetic $r_1$ and $r_2$ reactivity ratios are by definition linked to the ethylene propagation kinetics for their temperature (Ea) and pressure (ΔV) dependencies. In the simulations, it was assumed that the polyenes do not exhibit additional chain transfer activity. Furthermore, for the total consumption, incorporation and H-branch (inter- and intra-molecular) formation, it has been assumed that after incorporation of one functional group, the reactivity of the other functional group is not affected. In reality, the reactivity of second functional group will be decreased after incorporation of the polyene through its primary functional group in a polymer molecule. However, this assumption will not affect the scope of this study because this study focuses on the optimal incorporation and positioning of the polyene through the reaction of the first functional group in order to optimize the use and application of the polyene in regard to enhancement of rheological properties and prevention or reduction of reactor and preheater fouling and gel formation in the final product.

TABLE 2

Kinetic Constants for Selected CTA's and Polyenes (Bifunctional Components)

| | Chain Transfer to Modifier | | | | |
|---|---|---|---|---|---|
| | kao | Ea | ΔV | Reactivity Ratios | |
| Component | m$^3$/hr/kmol | cal/mol | cc/mol | $r_1$ ($k_{11}/k_{12}$) | $r_2$ ($k_{22}/k_{21}$) |
| Propylene (CTA) | 2.20E+11 | 13220 | −16.7 | 3.10 | 0.77 |
| Propionaldehyde (CTA) | 1.07E+11 | 9720 | −8.4 | 0.00 | 0.00 |
| Isobutane (CTA) | 3.51E+11 | 14020 | −16.7 | 0.00 | 0.00 |
| Diene bond A (Polyene) | 0 | NA | NA | 0.08 | 12.50 |

TABLE 2-continued

| Kinetic Constants for Selected CTA's and Polyenes (Bifunctional Components) | | | | | |
|---|---|---|---|---|---|
| | Chain Transfer to Modifier | | | | |
| | kao | Ea | ΔV | Reactivity Ratios | |
| Component | $m^3$/hr/kmol | cal/mol | cc/mol | $r_1$ ($k_{11}/k_{12}$) | $r_2$ ($k_{22}/k_{21}$) |
| Diene bond B (Polyene) | 0 | NA | NA | 0.40 | 2.50 |

NA-not applicable

TABLE 3

| Reactivity Ratios for Polyenes (Bifunctional Model Components) | | | | |
|---|---|---|---|---|
| | | Reactivity Ratios | | |
| | | $r_{1B}/r_{1A}$ | $r_1$ ($k_{11}/k_{12}$) | $r_2$ ($k_{22}/k_{21}$) |
| Sym bi-acrylate | Bond A | 1 | 0.08 | 12.50 |
| | Bond B | | 0.08 | 12.50 |
| Asym-acrylate | Bond A | 5 | 0.08 | 12.50 |
| | Bond B | | 0.40 | 2.50 |
| Sym HC diene | Bond A | 1 | 1 | 1 |
| | Bond B | | 1 | 1 |

Sym bi-acrylate = symmetrical bi-acrylate
Asym-acrylate = asymmetrical acrylate
Sym HC diene = symmetrical hydrocarbon diene Chain transfer activity and comonomer reactivity scheme data are described in the following: P. Ehrlich, G. A. Mortimer, *Fundamentals of the free radical polymerization of ethylene*, Adv. Polymer Sci., Vol 7, 386-448 (1970); G. Mortimer, Journal of Polymer Science: Part A-1*; Chain transfer in ethylene polymerization*; vol 4, p 881-900 (1966); G. Mortimer, Journal of Polymer Science: Part A-1, *Chain transfer in ethylene polymerization. Part IV. Additional study at* 1360 *atm and* 130° C.; vol 8, p 1513-1523 (1970); G. Mortimer, Journal of Polymer Science: Part A-1, *Chain transfer in ethylene polymerization. Part V. The effect of temperature*; vol 8, p 1535-1542 (1970); G. Mortimer, Journal of Polymer Science: Part A-1, *Chain transfer in ethylene polymerization Part V. The effect of pressure*, vol 8, p 1543-1548 (1970); and G. Mortimer, Journal of Polymer Science: Part A-1, *Chain transfer in ethylene polymerization VII. Very reactive and depleteable transfer agents*, vol 10, p 163-168 (1972).

Description of Flow Diagram

FIG. 1 shows a generalized flow scheme of a simulated high pressure polymerization plant configuration with a tubular reactor. Stream (1), fresh ethylene make-up, is compressed together with the outlet of the Booster by the Primary to stream (2). Stream (2) is combined with high pressure recycle stream (18) and distributed over the suction inlets of the Hyper. The Hyper pressurizes the ethylene feed streams to a level sufficient to feed the high pressure tubular reactor (Reactor). Although not depicted, the flow scheme could include partial combination and/or distribution of the stream (2) and stream (18) over the inlets of the Hyper.

Stream (4) and/or (5) depicts the CTA system make-up feed. The CTA make-up can, in principle, be freely distributed over the main compression streams fed and/or distributed over the side stream (8) and front stream (9). CTA make-up streams (4) and/or (5) can be fed in the inlet(s), interstage(s), outlet(s) of the Hyper and/or inlet(s) of the reaction zones. The CTA system can consist of single and/or multiple components and include varying compositions.

Stream (6) and/or stream (7) depict the polyene feed. The polyene feed can, in principle, be freely distributed over the main compression streams fed to and/or distributed over the side stream (8) and/or front stream (9). Polyene streams (6) and/or (7) can be fed in the inlet(s), interstage(s), outlet(s) of the Hyper, individual ethylene feed streams to the reactor, and/or directly into the reaction zones. The discharge temperature of the Hyper is typically in the range of 60 to 100° C. The ethylene feed to the first reaction zone is typically preheated to a temperature from 130 to 180° C., while the ethylene of the side feed is fed to the reactor at the Hyper discharge temperature or cooled prior to feeding to the reactor.

The dimensions and configuration of the Reactor are given in Table 4. In the Reactor, the polymerization is initiated with the help of free radical initiation systems, injected and/or activated at the inlet of each reaction zone. The maximum temperature in each reaction zone is controlled at a set point by regulating the concentration and/or feed amount of initiation system at the start of each reaction zone. After finishing the reaction, and having applied multiple cooling steps, the reaction mixture is depressurized and/or cooled in (10), and separated in the high pressure separator (HPS). The HPS separates the reaction mixture into an ethylene rich stream (15), containing minor amounts of waxes and/or entrained polymer, and a polymer rich stream (11) which is sent for further separation to the LPS. Ethylene stream (15) is cooled and cleaned in stream (17). Stream (16) is a purge stream to remove impurities and/or inerts.

The polymer separated in LPS is further processed in (12). The ethylene removed (13) in the LPS is fed to the Booster, where, during the compression, condensables such as solvent, lubrication oil and others are collected and removed through stream (14). The outlet of the Booster is combined with make-up ethylene stream (1), and further compressed by the Primary.

General Polymerization Conditions Used in Comparative and Inventive Polymerizations CSTR Reactor Conditions Used in Comparative 0:

Comparative polymerization (CP) 0 was simulated as an adiabatic I zone CSTR (autoclave reactor, throughput=40,000 kg/hr; internal length=6.5 m; internal diameter=0.508 m) with one ethylene and branching agent (polyene) feed stream at the following conditions: pressure=2000 bar; $T_{inlet}$=40° C. and $T_{polymerization}$=250° C. CP0 was simulated with an overall concentration of 100 mole ppm branching agent (polyene) in the overall ethylene feed, while the melt index ($I_2$) of the final product was kept at 4 dg/min by adjusting the CTA concentration in the simulations.

Conversion levels and information on polyene incorporation and H-branch formation are given in Table 5. Due to the fully back-mixed reactor system, the polymer is fully homogeneous in regard to the SCB, LCB, branching agent incorporation and H-branch formation level and frequency. The frequencies are expressed as #/1000 C.

Due to the lower ethylene conversion level (15.2% for CP0 versus around 34% for all other examples) and the constant branching agent concentration of 100 mole ppm in the ethylene feed, a higher incorporation level in the polymer is achieved in CP0, despite the lower percent of conversion for the branching agent. In practice, the concentration of branching agent in the feed will be adjusted, depending on melt strength target and effectiveness of incorporating of the branching agent, but the build-in level for the polymer formed in a CSTR reactor would still be homogeneous at a lower level. Furthermore, the conversion level of the branching agent and the percentages IDBA, IDBB, HA and HB formation will not be affected by a changing concentration of branching agent in the ethylene feed of a CSTR.

Incorporation through B functionality leads to an internal (available) double bond A (IDBA), while incorporation through A functionality leads to an internal (available) double bond B (IDBB). Further reaction of the polyene leads to inter- or intra-molecular H-branch formation through the remaining internal double bond A (HA) in the case of a IDBA, or through the remaining internal double bond B (HB) in the case of a IDBB.

Description of Reactor and Feed Configuration Applied in Comparative Polymerizations 1-3 and Inventive Polymerizations 1-7:

Comparative polymerizations (CP) 1-3 and inventive polymerizations (IP) 1-7 have been simulated with an overall concentration of 100 mole ppm branching agent (polyene) in the overall ethylene feed, while the melt index ($I_2$) of the final product was kept at 4 dg/min by adjusting the CTA concentration in the simulations.

Table 4 shows the reactor configurations in respect to dimensions, reaction zone lay-out and the applied ethylene feed and polyene feed distribution for the simulated comparative and inventive polymerizations. The feed distributions show the percent of total ethylene or branching agent feed stream fed to each reaction zone (Rx) separated by "/". For example, the notation 65/35/0/0 means that 65% and 35% of the total reactant (i.e., ethylene or polyene) is fed to the first and second reaction zone, respectively, while no fresh feed streams (not including carry-over from previous reaction zones) are fed to the third and fourth reaction zones. Further columns give information on pressure level and start temperature at the inlet of the 1st reaction zone, the ethylene feed temperature, when a side ethylene feed stream is applied, and the maximum or peak temperatures in each reaction zone. The last columns of Table 4 indicate the type and reactivity ratio of the simulated branching agent.

Figure 2:
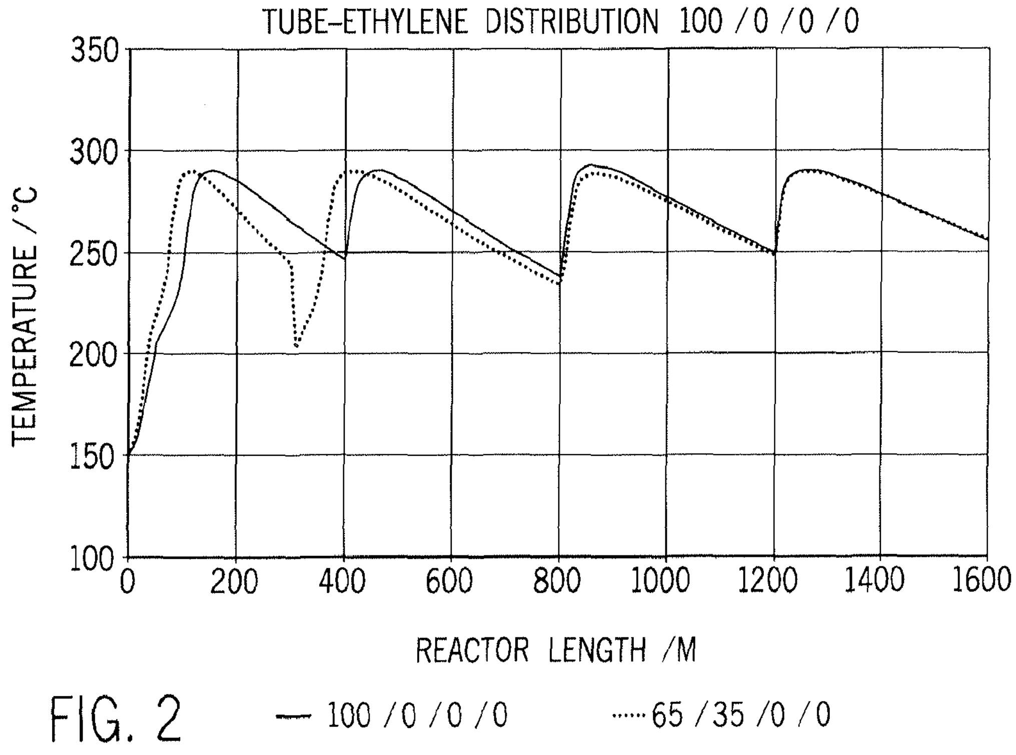
FIG. 2 shows the temperature profile for the tubular configuration used in comparative polymerizations 1-2 and inventive polymerizations 1-3.
Figure 3:
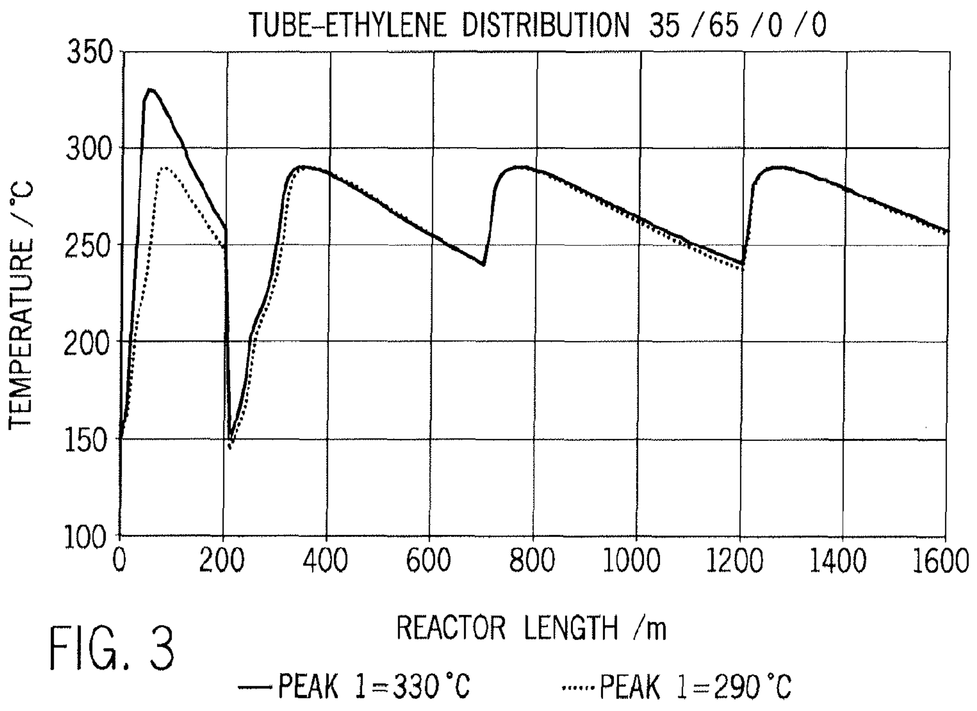
FIG. 3 shows the temperature profile for the tubular configuration used in inventive polymerizations 4-6.
Figure 4:
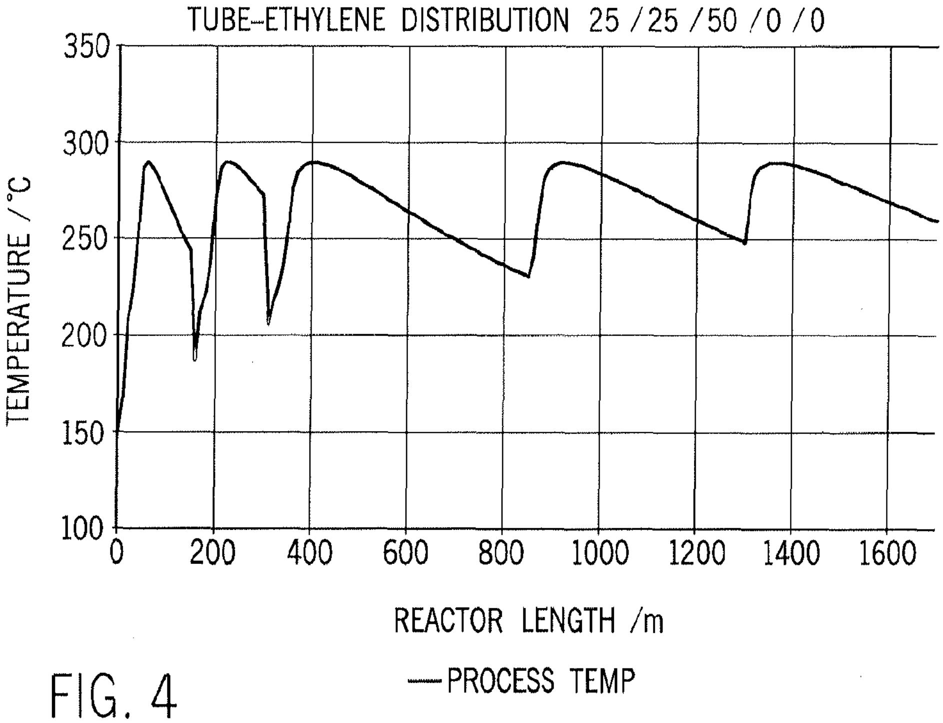
FIG. 4 shows the temperature profile for the tubular configuration used in comparative polymerizations 3 and inventive polymerization 7.

The reactor temperature profiles are given in FIGS. 2 to 4. In these diagrams, all reaction zones have one cooling section; however multiple cooling sections with counter- or co-current heat transfer media operating at differentiated inlet temperatures may be used.

Table 5 shows the simulated levels of ethylene and polyene (branching agent) conversion, the SCB and LCB frequency in polymer, and how the polyene is incorporated into the polymer.

TABLE 4

Reactor Configurations, Feed Modes, Process Conditions and Polyenes Used in Comparative and Inventive Polymerizations

| | # of Rx-zones | Ethylene feed distribution over Rx-zones (wt %) | Polyene feed distribution over Rx-zones (wt %) | Reactor inlet pressure (bar) | Start temp. in Rx-zone 1 (° C.) | Temp. of Ethylene side feed (° C.) | Max. temp. in Rx-zones | Polyene functionality | $r_{1B}/r_{1A}$ |
|---|---|---|---|---|---|---|---|---|---|
| Comparative Polymerizations (CP) 1-2 and Inventive Polymerizations (IP) 1-2: Inside tube diameter (60 mm) and Rx-zone length (distribution): 1600 m (400-400-400-400 m) | | | | | | | | | |
| CP1 | 4 | 100/0/0/0 | 100/0/0/0 | 2500 | 150 | — | All 290 | Sym bi-acrylate | 1 |
| CP2 | 4 | 100/0/0/0 | 100/0/0/0 | 2500 | 150 | — | All 290 | Sym HC diene | 1 |
| IP1 | 4 | 100/0/0/0 | 100/0/0/0 | 2500 | 150 | — | All 290 | Asym-acrylate | 5 |
| IP2 | 4 | 100/0/0/0 | 50/50/0/0 | 2500 | 150 | — | All 290 | Asym-acrylate | 5 |
| Inventive Polymerization (IP) 3: Inside tube diameter 50-60-60-60 mm and Rx-zone length (distribution): 1600 m (300-500-400-400 m) | | | | | | | | | |
| IP3 | 4 | 65/35/0/0 | 0/100/0/0 | 2500 | 150 | 80 | All 290 | Asym-acrylate | 5 |
| Inventive Polymerizations (IP) 4-6: Inside tube diameter 40-60-60-60 mm and Rx-zone length (distribution): 1600 m (200-500-500-400 m) | | | | | | | | | |
| IP4 | 4 | 35/65/0/0 | 0/50/50/0 | 2500 | 150 | 80 | All 290 | Asym-acrylate | 5 |
| IP5 | 4 | 35/65/0/0 | 0/100/0/0 | 2500 | 150 | 80 | All 290 | Asym-acrylate | 5 |
| IP6 | 4 | 35/65/0/0 | 0/100/0/0 | 2500 | 150 | 80 | 330/290/290/290 | Asym-acrylate | 5 |
| Comparative Polymerization (CP) 3 and Inventive Polymerizations (IP) 7-8: Inside tube diameter 35-50-60-60-60 mm and Rx-zone length (distribution): 1700 m (150-150-500-500-400 m) | | | | | | | | | |
| CP3 | 5 | 25/25/50/0/0 | 25/25/50/0/0 | 2500 | 150 | 80 | All 290 | Sym bi-acrylate | 1 |
| IP7 | 5 | 25/25/50/0/0 | 25/25/50/0/0 | 2500 | 150 | 80 | All 290 | Asym-acrylate | 5 |
| IP8 | 5 | 25/25/50/0/0 | 0/100/0/0/0 | 2500 | 150 | 80 | All 290 | Asym-acrylate | 5 |

TABLE 5

Predicted Conversion, Branching and Polyene Incorporation Levels

| | Polyene functionality | $r_{1B}/r_{1A}$ | Reactor conversion wt % | Polyene conversion wt % | LCB/ 1000 C | SCB*/ 1000 C | Incorporation of polyene as HB mol % | as HA mol % | as IDBA mol % | as IDBB mol % |
|---|---|---|---|---|---|---|---|---|---|---|
| CP0 | Asym-acrylate | 5 | 15.2 | 73.05 | 3.02 | 25.2 | 21.5 | 21.5 | 9.5 | 47.6 |
| CP1 | Sym bi-acrylate | 1 | 33.2 | 99.996 | 3.63 | 24.5 | 49.4 | 49.4 | 0.6 | 0.6 |
| CP2 | Sym HC diene | 1 | 33.2 | 49.8 | 3.66 | 24.6 | 10 | 10 | 40 | 40 |
| CP3 | Sym bi-acrylate | 1 | 35.3 | 99.61 | 4.05 | 24.4 | 48.9 | 16.1 | 0.5 | 34.4 |
| IP1 | Asym-acrylate | 5 | 33.2 | 99.77 | 3.63 | 24.5 | 47.2 | 16.2 | 0.4 | 36.2 |
| IP2 | Asym-acrylate | 5 | 33 | 98.65 | 3.62 | 24.5 | 26.6 | 8.5 | 0.6 | 64.3 |
| IP3 | Asym-acrylate | 5 | 33.1 | 98.98 | 3.64 | 24.3 | 37.5 | 15.5 | 1.2 | 45.9 |
| IP4 | Asym-acrylate | 5 | 32.8 | 96.49 | 3.52 | 23.7 | 32.4 | 14.3 | 2.3 | 50.9 |
| IP5 | Asym-acrylate | 5 | 33 | 99.47 | 3.54 | 23.7 | 42 | 15.9 | 0.7 | 41.3 |
| IP6 | Asym-acrylate | 5 | 34 | 99.46 | 3.84 | 24.4 | 41.9 | 15.0 | 0.8 | 41.4 |
| IP7 | Asym-acrylate | 5 | 35.29 | 99.92 | 4.04 | 24.4 | 53.1 | 16.5 | 0.2 | 30.3 |

*ethyl/butyl branches by backbiting; polymers prepared in the absence of propylene or other olefinic CTAs

Product Density Prediction

The product density was modeled as function of simulated SCB frequency with the help of known densities and simulated SCB levels of products disclosed in Table 6. Regarding SCBs, the backbiting mechanism generates mostly ethyl and butyl branches, while methyl branches are formed through copolymerization when propylene is used as CTA to lower product density. A methyl branch has less impact on product density then a ethyl/butyl branch and, for calculation purposes, it has been assumed that the impact of a methyl branch is 75% of the impact of an ethyl/butyl branch on product density, leading to:

$$SCB_{dens}=SCB_{by\ backbiting}+0.75*SCB_{by\ propylene}$$

The same calculation rule was assumed for the density predictions shown in Table 7.

TABLE 6

Simulated SCB Levels and Densities of Broad MWD LDPE and HDPE Products

| Product | MI (dg/min) | density ($g/cm^3$) | simulated SCB* (/1000C) |
|---|---|---|---|
| LDPE | 4 | 0.919 | 27 |
| HDPE | 4 | 0.965 | Not simulated |

*ethyl/butyl branches by backbiting; polymers prepared in the absence of propylene or other olefinic CTAs The following equation has been derived by applying a linear regression, wherein SCB is as defined in Table 6 above:

$$density=-1.6911E^{-03}*SCB+9.6503E^{-01}$$

This equation is used to predict the product density of the polymer made according the conditions of IP6, as described above, and with respectively a saturated CTA (sat CTA) and propylene as CTA.

TABLE 7

Predicted Product Density as Function of SCB by Backbiting and Methyl Formation by Propylene Copolymerization
Density = 0.965 − 0.00169*$SCB_{dens}$
IP6 and CTA evenly distributed over ethylene feed streams

| CTA Type | sat CTA | Propylene |
|---|---|---|
| SCB by backbiting (/1000 C) | 23.75 | 23.75 |
| SCB by propylene (/1000 C) | 0 | 4.36 |
| $SCB_{dens}$ (/1000) for density prediction | 23.75 | 27.02 |
| Density prediction (g/cc) | 0.9249 | 0.9193 |

The simulations for IP6 show that the density can be varied between 0.919 and 0.925 g/cc by CTA selection, while keeping all other process conditions constant. Variation in process conditions, like operating pressure, temperature, reactor configuration, etc., will allow a further extension of the density range. For instance, higher operating pressure and lower peak temperatures can be applied to increase product density and vice versa, while the rheological and/or MWD requirements can be met by varying the level of polyene (bifunctional component).

Estimation of n-Hexane Extractable Level:

The extractability of polymer molecules in non-polar solvents is influenced by polymer density (or in other words, by polymer melting point or SCB frequency), and molecule weight. A higher SCB level and lower molecular weight will promote extraction. In a tubular reactor, the polymer formed in the last reaction zone, at peak temperature, will greatly contribute to and determine the final extractable level, since it typically has the highest level of SCB combined with a low chain length, due to lower DP and the higher degree of LCB. The probability of further growth of formed small molecules by the LCB mechanism is minimal by size of the molecules and low amount of remaining polymerization.

The chain length can be calculated with the help of the following formula: Chain length=1000 C/(1/DP+$LCB_{freq}$). Using the maximum SCB level and maximum LCB frequency in the last reaction zone, an average value for the minimum polymer chain length can be calculated. The minimum chain length listed in Table 8 includes the number of carbon atoms of the linear backbone as well as of the attached SCBs.

The n-hexane extractable level is estimated with the help of the maximum SCB content and the calculated average minimum chain length of formed new polymer molecules in the last reaction zones. See Table 8 for measured, modeled and estimated data. The polymers have similar melt strength and G' values.

TABLE 8

Estimation of n-hexane extractable level

| | | Whole Polymer | | | Polymer formed in 4th Reaction zone | | | | |
|---|---|---|---|---|---|---|---|---|---|
| | | | | | Max | Max | | Min. | |
| | CTA | MI dg/min | Density g/cc | SCB freq./ 1000 C | SCB freq./ 1000 C | LCB freq./ 1000 C | 1/DP/ 1000 C | chain length # Cs | n-Hexane extractables wt % |
| LDPE | PA | 4* | 0.919* | 27 | 36.6 | 11.4 | 1.12 | 79.9 | 3.42* |
| IP5 | Butane and/or PA | 4 | 0.925 | 24 | 32.5 | 9.5 | 0.99 | 95.5 | <2.6** |

PA = propionaldehyde

*Measured

**Estimation of n-hexane extractable level with the help of LDPE reference data and simulated trends for Polymer formed in the last reaction zone

Comparative Polymerizations 1-2 and Inventive Polymerizations 1-2

Figure 5:
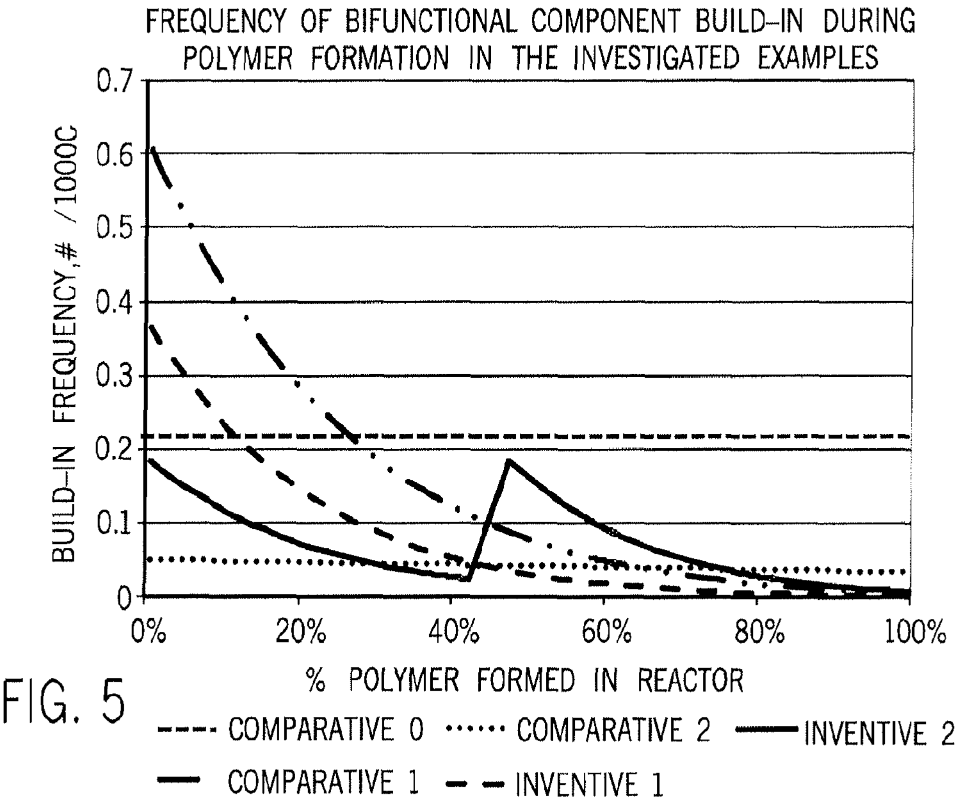
FIG. 5 shows the incorporation frequency of polyene (bifunctional component) into locally-formed polymer versus reactor length for comparative polymerizations 0-2 and inventive polymerizations 1-2.

CP1, CP2 and IP1 show the impact of the type and reactivity (distribution) of the polyene (branching agent). The impact of a changing feed distribution of the Asym-acrylate has been simulated in Inventive 1 and Inventive 2. FIG. 5 shows the incorporation frequency of polyene (bi-functional component) in the polymer as function of percent polymer formed along the reactor for CP 0-2 and IP 1-2. In summary the following remarks can be made:

CP1: Sym bi-acrylate leads to a very high and very inhomogeneous incorporation level. The probability for secondary reactions (H-branch formation) is very high and localized, and will mainly occur in polymer molecules, which are originating from the 1st reaction zone, and will make part of the very high molecular weight fraction in the final polymer. Furthermore, due to the long chain branching mechanism, and the continuation of growth along the reactor, the chain segments containing high levels of branching agent will have high priority and seniority in the molecular topology, more prone to shielding effects and intramolecular reaction will be promoted as secondary reaction. All these effects increase the tendency for gel formation.

CP2: Sym HC-diene leads to a very homogeneous and low incorporation level. Furthermore, the probability for secondary reactions (H-branch formation) is very low, due to low reactivity and very low levels of IDBA and IDBB formed. Therefore, Sym HC-dienes are less effective in broadening MWD and increasing melt strength. Furthermore, the high level of unreacted and residual diene in the product is a negative factor for food contact application as extrusion coating.

IP1: Asym-acrylate leads to a high and inhomogeneous incorporation level. The probability for secondary reactions (H-branch formation) to occur in the 1st reaction zone is strongly reduced, versus CP1, due to the lower reactivity of the B-functionality, and therefore adverse effects like gel formation are unexpectedly reduced.

IP2: The distribution of asym-acrylate leads to a more homogeneous incorporation level. The asym-acrylate is, after reaction of its first functionality, more homogeneously, and with a lower priority and seniority, distributed (intra-molecular) over the larger molecules, thus unexpectedly reducing gel formation and potential for intramolecular reaction, while promoting intermolecular reaction leading to more effective H-branch formation and increased melt strength.

Inventive Polymerizations 3-6

Figure 6:
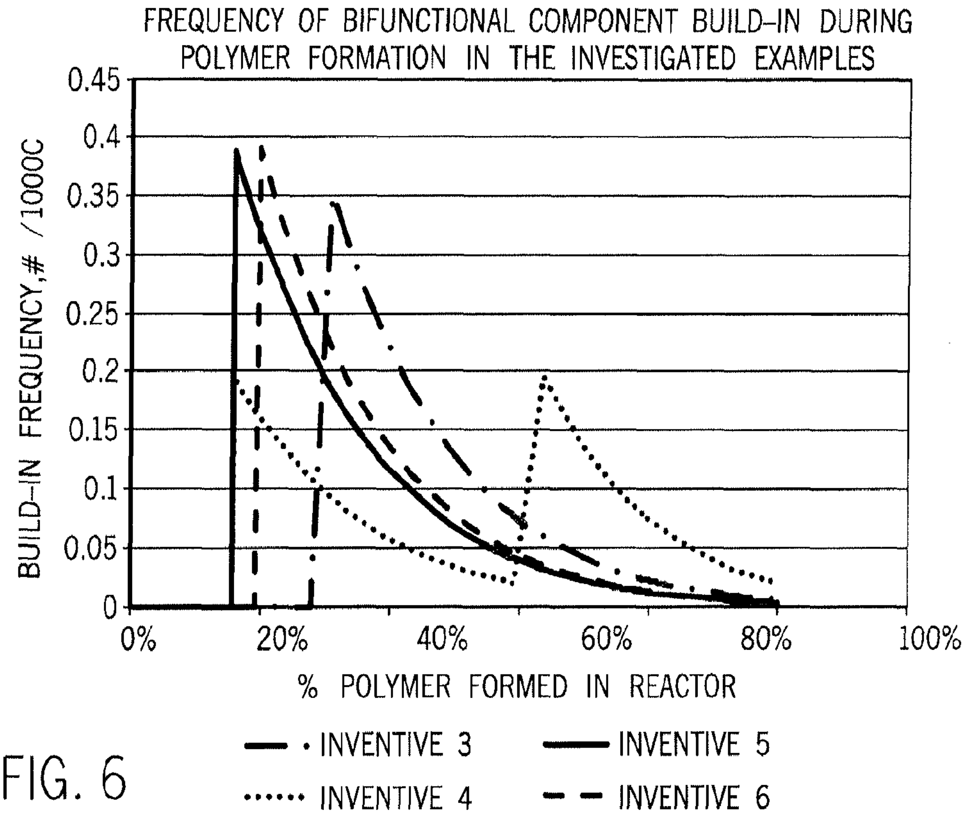
FIG. 6 shows the incorporation frequency of polyene (bifunctional component) into locally-formed polymer versus reactor length for inventive polymerizations 3-6.

IP3 and IP5 show the impact of ethylene distribution when the polyene (asym-acrylate) is fed entirely to the second reaction zone. In IP5, less polymer (containing no polyene) is made in the first reaction zone, while the advantages of IP3, that is, not exposing the reactor preheater and the first reaction zone to polyene, are maintained. The impact of changing feed distribution of asym-acrylate is simulated in IP4. Distribution of the asym-acrylate polyene over the second and third reaction zones leads to a more homogeneous incorporation, although at the cost of a reduced incorporation level and reduced secondary reactions. FIG. 6 shows the incorporation frequency of the polyene in the polymer formed along the reactor for IP3-6.

Figure 8:
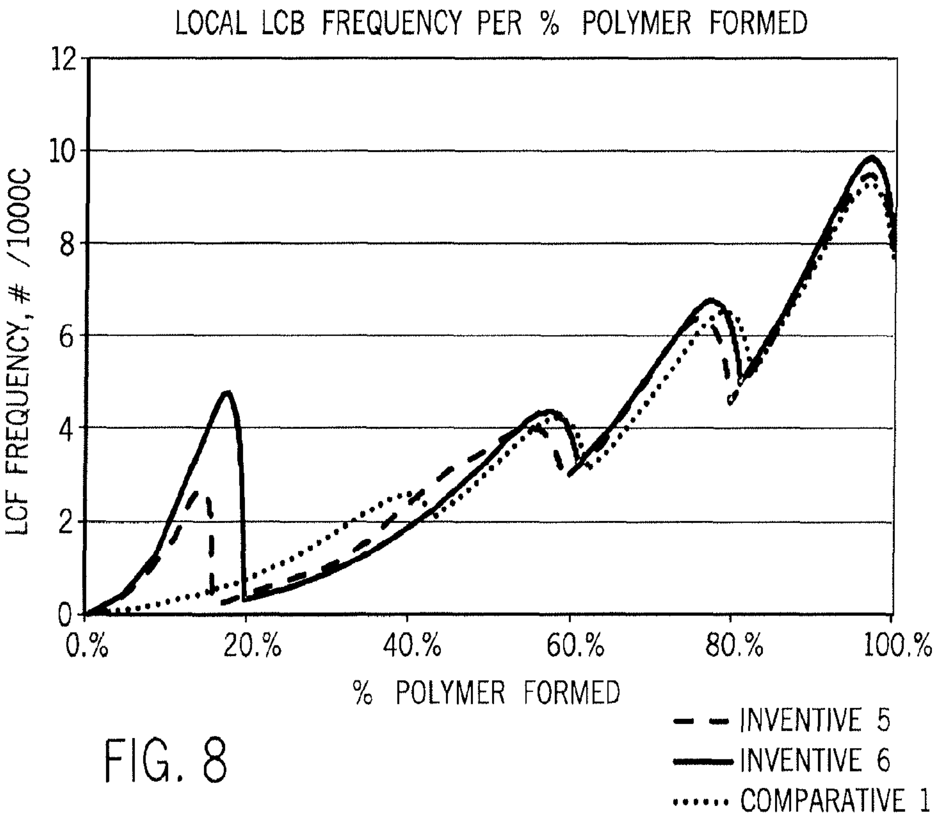
FIG. 8 shows the LCB frequency per 1000 carbons in percent of polymer formed for comparative polymerization 1 and inventive polymerizations 5-6.

The impact of changing first reaction zone temperature is shown in IP6. IP6 differs from IP5 in first reaction zone maximum temperature (330° C. versus 290° C.). FIG. 8 shows the increased LCB frequency of Inventive 6 versus Inventive 5 and Comparative 1. As illustrated by IP6, not exposing the reactor preheater and first reaction zone to a polyene allows raising the maximum temperature in the first reaction zone and the reactor conversion level, while the overall LCB level, and therefore product melt strength range, is enhanced, while reactor fouling and product gel issues are reduced or prevented.

Comparative Polymerization 3 and Inventive Polymerization 7

Figure 7:
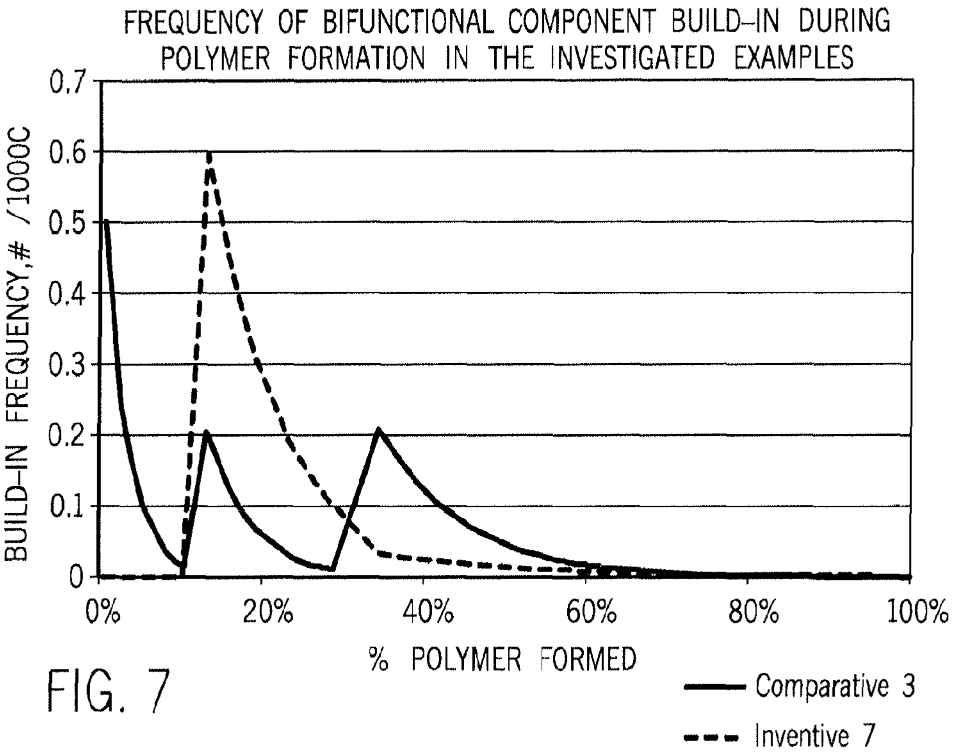
FIG. 7 shows the incorporation frequency of polyene (bifunctional component) into locally-formed polymer versus reactor length for comparative polymerization 3 and inventive polymerization 7.

CP3 and IP7 show the impact of the reactivity of the bifunctional component when the bifunctional component is evenly distributed over the applied ethylene feed distribution. The incorporation frequency of the polyene in the polymer formed along the reactor for CP3 and IP7 is shown in FIG. 7. The application of asym-acrylate gives a more homogeneous incorporation frequency as compared to using sym bi-acrylate.

Although the invention has been described in considerable detail in the preceding examples, this detail is for the purpose of illustration, and is not to be construed as a limitation on the invention as described in the following claims. Furthermore, the invention can be combined with other process elements, like ethylene and CTA make up feed distributions, CTA selection, etc., in respect to further enhancement of product properties, for example, gel content, MWD, density, and other properties.

Description of Flow Diagram Used for Comparative Example A' and Inventive Example 1', 2' and 4'

Figure 9:
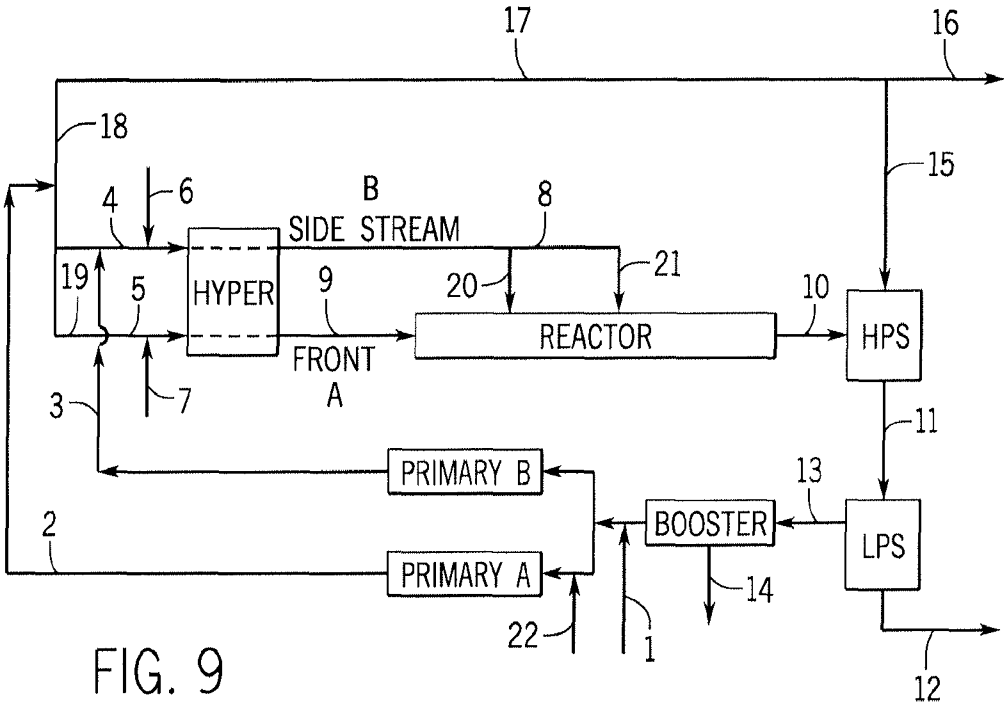
FIG. 9 shows a flow diagram for the polymerizations used for Comparative Example A', Inventive Examples 1', 2' and 4'.

FIG. 9 shows the flow scheme of the high pressure polymerization process with a tubular reactor used to produce comparative example A' and inventive examples 1', 2' and 4. Stream (1), fresh ethylene make-up, is compressed together with the outlet of the Booster by two parallel Primary compressors A+B, both have similar capacity, resulting in flow (2) and flow (3). CTA is added through (22) to the feed of Primary compressor A. Stream (2) is combined with high pressure recycle stream (18), and distributed over flow (4) and flow (19). The Hyper compressor part feeding the front (9) of the reactor, receives from line (18) ethylene feed through line (19) and line (5). The Hyper compressor part feeding the side stream (8) receives ethylene feed through line (4). Line (4) receives ethylene feed from line (3) and additional ethylene from line (18). The Hyper pressurizes the ethylene feed streams to a level sufficient to feed the high pressure tubular reactor (Reactor).

Stream (6) and/or stream (7) depict the polyene feed. Information about the Reactor system can be found below. In the Reactor, the polymerization is initiated with the help of free radical initiation systems, injected and/or activated at the inlet of each reaction zone. The maximum temperature in each reaction zone is controlled at a set point by regulating the concentration and/or feed amount of initiation system at the start of each reaction zone. After finishing the reaction, and having applied multiple cooling steps, the reaction mixture is depressurized and/or cooled in (10), and separated in the high pressure separator (HPS). The HPS separates the reaction mixture into an ethylene rich stream (15), containing minor amounts of waxes and/or entrained polymer, and a polymer rich stream (11) which is sent for further separation to the LPS. Ethylene stream (15) is cooled and cleaned in stream (17). Stream (16) is a purge stream to remove impurities and/or inerts.

The polymer separated in LPS is further processed in (12). The ethylene removed (13) in the LPS is fed to the Booster, where, during the compression, condensables such as solvent, lubrication oil and others are collected and removed through stream (14). The outlet of the Booster is combined with make-up ethylene stream (1), and further compressed by the Primary compressors.

Description of Flow Diagram Used for Inventive Example 3'

Figure 10:
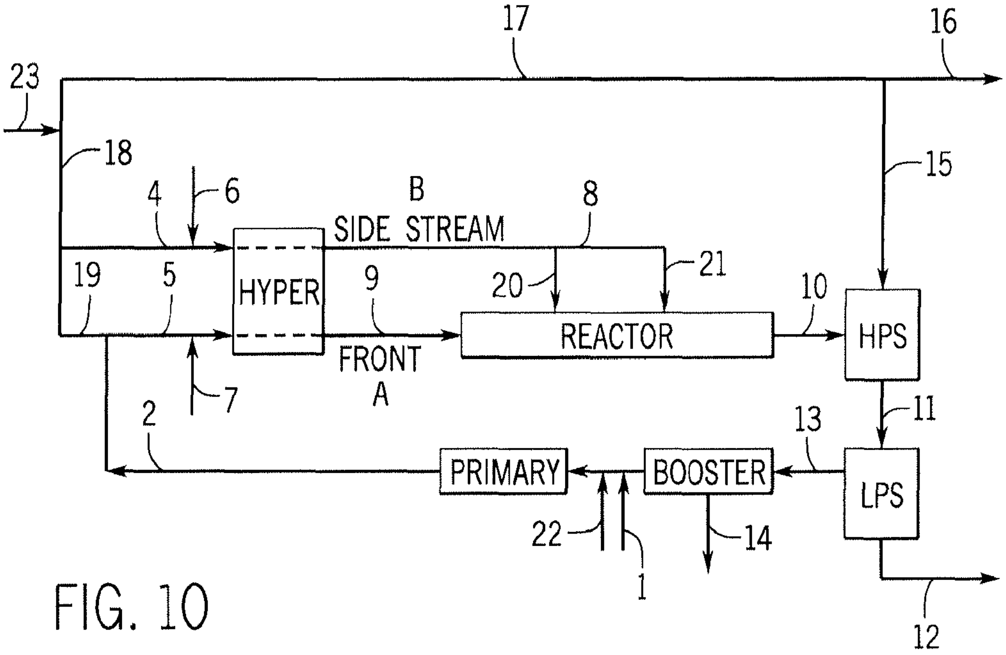
FIG. 10 shows a flow diagram for the polymerizations used for Inventive Example 3'.

FIG. 10 shows the flow scheme of the high pressure polymerization process with a tubular reactor, used to produce Inventive Example 3'. Stream (1), fresh ethylene make-up, is compressed together with the outlet of the Booster by Primary compressor system resulting in flow (2). Stream (2) is combined with high pressure recycle stream (19) and fed through line 5 to the Hyper compressor part feeding the front (9) of the Reactor. The Hyper compressor part feeding the side stream (8) receives ethylene feed through line (4). Line (4) receives ethylene feed from line (18). The CTA is fed through line (23). Line 22 is an optional line to feed a CTA component, but was not used in Example 3'. The Hyper pressurizes the ethylene feed streams to a level sufficient to feed the high pressure tubular reactor (Reactor).

Stream (6) and/or stream (7) depict the polyene feed. Information about the Reactor system can be found below. In the Reactor, the polymerization is initiated with the help of free radical initiation systems, injected and/or activated at the inlet of each reaction zone. The maximum temperature in each reaction zone is controlled at a set point by regulating the concentration and/or feed amount of initiation system at the start of each reaction zone. After finishing the reaction, and having applied multiple cooling steps, the reaction mixture is depressurized and/or cooled in (10), and separated as discussed above for FIG. 9.

Additional Polymerizations—Example A' (Comparative LDPE)

The polymerization was carried out in tubular reactor with three reaction zones. In each reaction zone, pressurized water was used for cooling and/or heating the reaction medium, by circulating this water through the jacket of the reactor. The inlet-pressure was 2220 bar, and the pressure drop over the whole tubular reactor system was about 300 bars. Each reaction zone had one inlet and one outlet. Each inlet stream consisted of the outlet stream from the previous reaction zone and/or an added ethylene-rich feed stream. The non-converted ethylene, and other gaseous components in the reactor outlet, were recycled through a high pressure and a low pressure recycles, and were compressed and distributed through a booster, a primary and a hyper (secondary) compressors, according flow scheme shown in FIG. 9. Organic peroxides (see Table 9) were fed into each reaction zone. Iso-butane was used as a chain transfer agent (CTA), and it was present in each reaction zone inlet, originating from the low pressure and high pressure recycle flows (#13 and #15), as well as from freshly injected CTA make-up stream #22. The make-up ethylene is fed through stream #1.

After reaching the first peak temperature (maximum temperature) in reaction zone 1, the reaction medium was cooled with the aid of the pressurized water. At the outlet of reaction zone 1, the reaction medium was further cooled by injecting a fresh, cold, ethylene-rich feed stream (#20), and the reaction was re-initiated by feeding an organic peroxide system. This process was repeated at the end of the second reaction zone, to enable further polymerization in the third reaction zone. The polymer was extruded and pelletized (about 30 pellets per gram), using a single screw extruder, at a melt temperature around 230-250° C. The weight ratio of the ethylene-rich feed streams to the three reaction zones was 1.00:0.80:0.20. The internal process velocity was approximately 12.5, 9 and 11 m/sec for respectively the $1^{st}$, $2^{nd}$ and $3^{rd}$ reaction zones. Additional information can be found in Tables 10 and 11.

Example 1' (Inventive Ethylene-Based Polymer

The polymerization was carried out in tubular reactor with three reaction zones, as discussed above for Comparative A'.

All process conditions are the same as for Comparative Example A', except the rheology modifier (PPG-AEMA=Polypropylene glycol allyl ether methacrylate) was added via stream #7 and #6. The amount can be found in Table 11. Additional information can be found in Tables 9 and 10. PPG-AEMA resembles the polyene which is described in Table 3 as asymmetrical acrylate with the reactivity ratio r1b/r1a=5. Simulation results on this polyene can be found in Table 5. The structure and additional properties for PPG-AEMA can be found below:

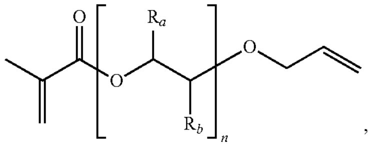

,

Mn of about 280 g/mole; n from about 1 to about 10; isomeric oligomeric mixture, for each n, Ra=H and Rb=CH3, and Ra=CH3 and Rb=H).

Synthesis of Asymmetrical Diene Poly(Propylene Glycol) Allyl Ether Methacrylate (PPG-AEMA)

All methacrylate monomers in this application were prepared in accordance with the method of Example 1 in U.S. Pat. No. 4,916,255. In this case, XUS-13402.00, a polyglycol, commercially available from The Dow Chemical Company, was used to make the poly(propylene glycol) ally) ether methacrylate.

Example 2' (Inventive Ethylene-Based Polymer)

The polymerization was carried out in tubular reactor with three reaction zones, as discussed above for Inventive Example 1'. All process conditions are the same as for Example 1', except propylene was used as CTA, and CTA was added via stream #22 (see FIG. 9), and the inlet pressure of reaction zone 1 was lowered. Additional information can be found in Tables 9-11.

Example 3' (Inventive Ethylene-Based Polymer)

The polymerization was carried out in tubular reactor with three reaction zones. See FIG. 10. The non-converted ethylene, and other gaseous components in the reactor outlet, were recycled through the high pressure and low pressure recycles, and were compressed and distributed through the booster, primary and hyper (secondary) compressors according to the flow scheme as shown in FIG. 10. This configuration leads to the lowest ratios of CTA concentration in the front ethylene-based feed versus the concentrations of CTA in sequential ethylene-based feed streams. While in Example A', 1', 2' and 4' the ratios of CTA concentration in the front ethylene-based feed versus the concentrations of CTA in sequential ethylene-based feed streams were higher, and above 1.

In each reaction zone, the polymerization was initiated with organic peroxides as described in Comparative Example A'. After reaching the first peak temperature in reaction zone 1, the reaction medium was cooled down with pressurized water. At the outlet of the first reaction zone, the reaction medium was further cooled by injecting a fresh, cold ethylene-rich feed stream (#20), and the reaction was initiated again by feeding an organic peroxide system into the reaction zone. This process was repeated at the end of the second reaction zone, to enable further polymerization in the third reaction zone.

The weight ratio of the ethylene-rich feed streams to the three reaction zones was 1.00:0.60:0.40. For the chain transfer agent, propionaldehyde (PA) was used, and it was present in each reactor inlet, originating from the low and high pressure recycle flows (#13 and #15), as well as from freshly injected CTA make-up stream #23. The make-up ethylene is fed through stream #1. Like Example 1', the rheology modifier (PPG-AEMA) was added via stream #7 and #6. Additional information can be found in Tables 9-11.

Example 4' (Inventive Ethylene-Based Polymer)

The polymerization was carried out in tubular reactor with three reaction zones, as discussed above for Inventive Example 1' (see FIG. 9). All process conditions are the same as for Example 1', except of the amount and feed-location of the rheology modifier. Additional information can be found in Tables 9-11.

TABLE 9

| Initiators | | |
|---|---|---|
| Initiator | Abbreviation | Used in Rx-zone 1/2/3 |
| tert-Butyl peroxy-2-ethyl hexanoate | TBPO | yes/yes/no |
| Di-tert-butyl peroxide | DTBP | yes/yes/yes |

TABLE 10A

Pressure and temperature conditions of comparative and inventive examples

| Ex. | Type | Inlet-pressure/bar | Start-temp./° C. | reinitiation temp. 2nd zone/° C. | reinitiation temp. 3rd zone/° C. | 1st Peak temp./° C. | 2nd Peak temp./° C. | 3rd Peak temp./° C. |
|---|---|---|---|---|---|---|---|---|
| A' | Comp. | 2220 | 140 | 150 | 207 | 294 | 292 | 294 |
| 1' | Inv. | 2220 | 144 | 148 | 211 | 293 | 293 | 293 |
| 2' | Inv. | 2155 | 145 | 148 | 217 | 293 | 293 | 294 |
| 3' | Inv. | 2140 | 145 | 160 | 199 | 293 | 293 | 293 |
| 4' | Inv | 2220 | 140 | 148 | 213 | 294 | 293 | 294 |

TABLE 10B

CTA Distribution

| Ex. | Mass fraction of Fresh Ethylene in reaction zone Ethylene feed* | | | Wt Ratio of CTA concentration in Ethylene reactor feeds** | |
|---|---|---|---|---|---|
| | Rx-Z1 | Rx-Z2 | Rx-Z3 | Rx-Z1/Rx-Z2 | Rx-Z1/Rx-Z3 |
| A' | 0.17 | 0.39 | 0.39 | 1.36 | 1.36 |
| 1' | 0.16 | 0.39 | 0.39 | 1.36 | 1.36 |
| 2' | 0.16 | 0.39 | 0.39 | 1.38 | 1.38 |
| 3' | 0.57 | 0.00 | 0.00 | 0.43 | 0.43 |
| 4' | 0.16 | 0.39 | 0.39 | 1.36 | 1.36 |

*Mass fraction of fresh ethylene is the ratio of the amount of fresh ethylene in the feed stream to the total amount of the ethylene-based feed stream.
**Wt ratio of CTA is determined by mass balance calculations over the process flow streams, taking into account the conversions in the reactor and the location and/or distribution of the fresh ethylene flow stream and the location and/or discribution of the fresh CTA flow stream.

TABLE 11

Additional information of the comparative and inventive examples

| Ex. | PPG-AEMA flow kg of diene per hour ($1^{st}/2^{nd}/3^{rd}$ zone) | PPG-AEMA (mole ppm diene in ethylene-based feed stream in each reaction zone***) ($1^{st}/2^{nd}/3^{rd}$ zone) | CTA | Ratio CTA concentration in front versus sequential feed flows* | Total Hyper throughput ton per hour | Polymer output ton per hour** | Melt Strength cN |
|---|---|---|---|---|---|---|---|
| A' | 0/0/0 | 0/0/0 | Iso-butane | >1 | 54.2 | 15.0 | 4.3 |
| 1' | 38/18/5 | 142/86/86 | Iso-butane | >1 | 54.2 | 14.9 | 8.9 |
| 2'$^a$ | 48/21/5 | 172/94/94 | Propylene | >1 | 56.4 | 15.5 | 7.4 |
| 3'$^a$ | 10/37/25 | 34/219/219 | PA | <1 | 56.2 | 15.9 | 8.0 |
| 4' | 0/50/13 | 0/233/233 | Iso-butane | >1 | 54.2 | 14.9 | 6.3 |

Note*: Ratio(s) of CTA concentration in the front ethylene-based feed versus the concentrations of CTA in sequential ethylene-based feed streams.
Note**: Polymer output was calculated from fresh ethylene (#1), CTA (#22 and or #23) and PPG-AEMA (#6 and or #7) intakes corrected for process purge stream (#16).
***Ethylene-based feed stream in each reaction zone refers to the feed stream compressed and fed by the hypercompressor, and containing a majority amount ethylene (for examples, greater than 80 wt % ethylene).
Other components, such as comonomer, CTA, peroxide dissociation products, solvent, etc., may also be present.
$^a$PPG-AEMA was deoxygenated prior to injection into each reactor zone.

TABLE 12

Polymer properties of the examples

| Ex. | MI ($I_2$) dg/min$^{-1}$ | Mw (abs) g/mol | GI-200 unit = mm$^2$ gel per 24.6 cm$^3$ of film | G' (at 170° C.; G'' = 500 Pa) unit = Pa | Density g/cm$^3$ | n-hexane extractable % | A + B($I_2$)* units = g/mol | C + Dlog($I_2$)** unit = Pa |
|---|---|---|---|---|---|---|---|---|
| A' | 4.0 | 118,100 | 0.7 | 89 | 0.9243 | 1.4 | 208,000 | 108 |
| 1' | 3.9 | 159,200 | 22.7 | 137 | 0.9248 | 1.7 | 208,800 | 109 |
| 2' | 4.1 | 161,700 | | 124 | 0.9204 | 2.1 | 207,200 | 107 |
| 3' | 3.8 | 153,000 | | 122 | 0.9258 | 1.3 | 209,600 | 110 |
| 4' | 3.7 | 136,400 | 56*** | 112 | 0.9243 | 1.5 | 210,400 | 111 |

*A = 2.40 × 10$^5$ g/mole, and B = −8.00 × 10$^3$ (g/mole)/(dg/min)
**C = 162 Pa and D = −90 Pa/log(dg/min)
***Average of two cast film runs.

Summary of Results for Polymerizations A' and 1'-4'

As shown in Table 12, the inventive ethylene-based polymers have significantly higher G' values, as compared to the comparative polymer, and these high G' values indicate higher melt strengths of the inventive polymers. See also Table 11. Higher melt strength provides for improved extrusion coating properties, for example reduced neck-in (shrinkage of web as compared to the die width; for example see US 2012/0252990 (page 11)) and better web stability during the extrusion coating process. The inventive examples using isobutane or propionaldehyde, as CTA (Examples 1', 3' and 4'), resulted in higher product densities, namely above 0.920 g/cc, and more specifically above 0.922 g/cc. The use of propylene, as CTA, resulted in product densities less than, or equal to, 0.920 g.

The examples using isobutane or propionaldehyde as CTA resulted in higher product densities, namely above 0.920 g/cc. and more specifically above 0.922 g/cc. The use of Propylene as CTA results in product densities equal to, or below, 0.920 g/cc. As seen in Table 12, the inventive polymers also meet the relationship: Mw(abs)<A+B($I_2$), where A=2.40×10$^5$ g/mole, and B=−8.00×10$^3$ (g/mole)/(dg/min), which indicates that the inventive polymers are produced at lower molecular weight (Mw(abs)) for good processability, and still have sufficiently high G' levels for coating applications (for example, extrusion coating).

Discussion of Actual Polymerization Results

The comparison of the Comparative Example A' with the Inventive Examples 1' to 4' shows that the PPG-AEMA (rheology modifier) is an effective rheology modifier. The results with iso-butane, as CTA, show the importance of the distribution of the rheology modifier over the reaction zones, to achieve a good balance between G' increase and low Gel levels. Measured is the "GI-200 Gel-count" in cast film applications, which value is indicative of the Gel-level in the final extrusion coating application; however due to significant higher temperatures and shear conditions in the extrusion coating process, the Gel levels in the fabricated articles are significantly reduced, and, thus, a coating formed from a modified ethylene-based polymer, described herein, would be comparable in appearance to a coating made from a conventional, un-modified ethylene-based polymer (for example, LDPE made in an autoclave process) with a similar density.

The comparison results of the iso-butane (CTA; reduced CTA-activity, at inlet of the reactor, as compared to the CTA-activity of propylene) with the propylene (CTA) shows the importance to reduce the CTA-activity at the inlet of the reactor and/or in the first reaction zone over the subsequent reaction zones. Replacing iso-butane by propylene resulted in lower densities, higher extractable level and less effective use of the rheology modifier, as shown by a higher consumption rate of the modifier.

Surprisingly, using PA (propionaldehyde), as CTA, and distributing its concentration and activity to the subsequent reaction zones, led to an effective use (high G' levels, low gel levels, and/or, in general, low consumption of the modifier) of the rheology modifier, and, here, a high G' value. The Gel level was visually lower, despite the higher initial molecular weight in the front of the reactor due to the applied distribution of propionaldehyde over the reaction zones.

Comparison of Actual with Simulated Polymerization Results

The simulated polymerizations, as discussed above, varied the ethylene feed (wt %) distribution over the reaction zones, namely 100/0/0/0, 65/35/0/0, 35/65/0/0 and 25/25/50/0/0. The actual polymerizations were carried in a three zone reactor with an ethylene feed (wt %) distribution of 50/40/10 and 50/30/20. Although the ethylene feed distributions differ between the actual and simulated polymerizations, the results of each can still be compared to estimate the impact of the distribution of the modifying agent (asym-acrylate or PPG-AEMA) of the ethylene-based polymers formed from the actual polymerizations. The simulation results indicated that feeding all rheology modifying agent to the front is good for increasing G', but increases the risk of Gel formation through localized inter- and intra-molecular H-branch formation. Furthermore, as shown in the simulated results, it was found that feeding the rheology modifying agent to rear reaction zones, led to a better distribution of the agent, but to a less ability of the rheology modifier agent to increase G'. Distributing the rheology modifying agent over the front and sequential reaction zones is preferred (see IP6). These findings from the simulations are comparable with the experimental polymerizations shown in Table 12, which shows the best results for Inventive Examples 1' and 3' for high G' values and sufficiently lower Gel levels. High G' values and low Gel levels are indicative of the effectiveness of the rheology modifying agent to increase G', and of the improved distribution of the rheology modifying agent in the final polymer.

In summary for all actual inventive polymerizations, it was found that the PPG-AEMA (rheology modifying agent) is an effective rheology modifier, its effectiveness is affected by the type and distribution of the CTA, and that the distribution of the rheology modifier needs to be carefully designed to achieve an optimum balance between high G' and low gel-level. The examples also show that PPG-AEMA (rheology modifying agent) is an effective rheology modifier agent for producing products with high melt strengths and high G' values at higher product densities, namely above 0.920 g/cc, and more specifically above 0.922 g/cc. The use of propylene as CTA results in product densities less than, or equal to, 0.921 g/cc. Furthermore it was found that the simulation results are indicative for the actual polymerization findings, in terms of the optimal use of the modifying agent to increase G' and to improve the distribution of the agent within the final polymer.

We claim:

1. A composition comprising an ethylene-based polymer, the ethylene-based polymer comprising ethylene and at least one asymmetrical polyene as the only monomeric units, comprising the following properties:

a) at least one incorporated structure derived from a polyene selected from the group consisting of the following i) through x):

i)

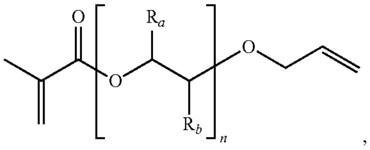

, wherein n is from 1 to 50; $R_a$ is selected from H or alkyl; and $R_b$ is selected from H or alkyl;

ii)

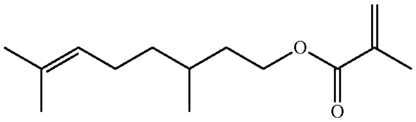

iii)

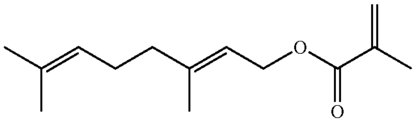

iv)

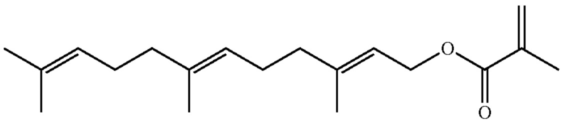

v)

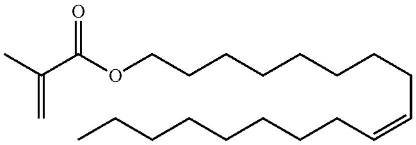

vi)

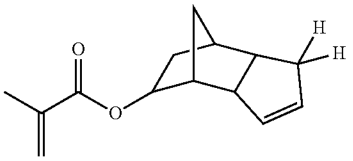

vii)

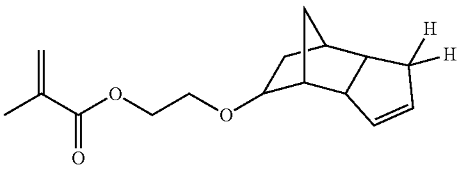

-continued viii)

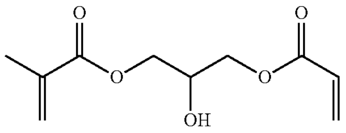

ix)

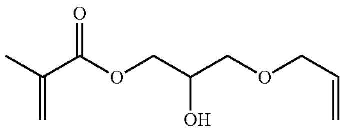

and x)

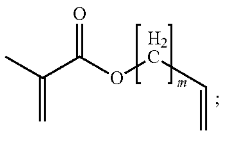

where m = 1 to 20 and b) a Mw(abs) versus melt index ($I_2$) relationship: Mw(abs)<A+B($I_2$), where A=$2.40\times10^5$ g/mole, and B=$-8.00\times10^3$ (g/mole)/(dg/min).

2. A composition comprising an ethylene-based polymer, the ethylene-based polymer comprising ethylene and at least one asymmetrical polyene as the only monomeric units, comprising at least one incorporated structure derived from a polyene selected from the group consisting of the following i) through x):

i)

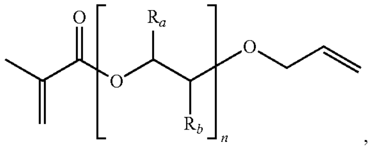

, wherein n is from 1 to 50; $R_a$ is selected from H or alkyl; and $R_b$ is selected from H or alkyl;

ii)

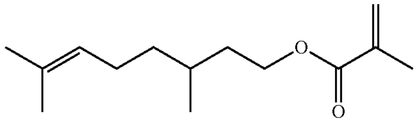

iii)

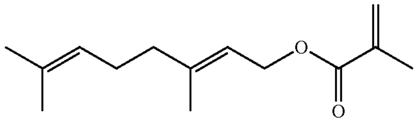

iv)

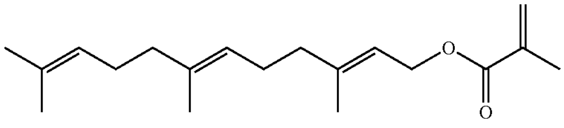

-continued v)

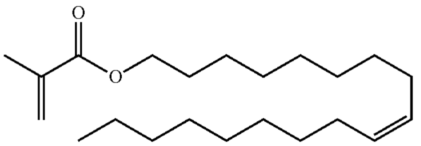

vi)

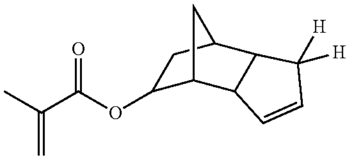

vii)

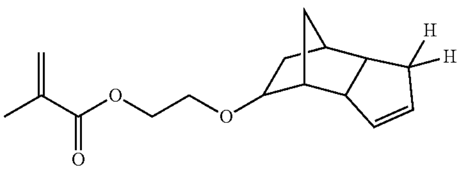

viii)

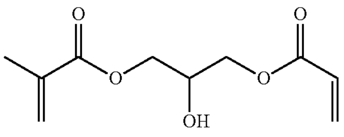

ix)

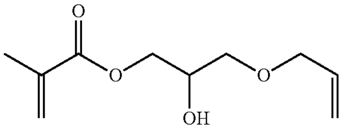

and x)

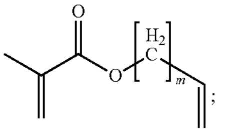

where m = 1 to 20 and wherein the polymer is formed in a reactor configuration comprising at least one tubular reactor.

3. The composition of claim 1, wherein the ethylene-based polymer has a G' value that meets the following relationship: G'≥C+D log($I_2$), wherein C=162 Pa and D=−90 Pa/log(dg/min).

4. The composition of claim 1, wherein the ethylene-based polymer has a density from 0.912 to 0.940 g/cc.

5. The composition of claim 4, wherein the ethylene-based polymer has an n-hexane extractables content of less than 4.0 wt %, based on the total weight of the polymer.

6. The composition of claim 1 wherein the ethylene-based polymer has a density from 0.920 to 0.940 g/cc.

7. The composition of claim 6, wherein the ethylene-based polymer has an n-hexane extractables content of less than 2.6 wt %, based on the total weight of the polymer.

8. The composition of claim 1, wherein the ethylene-based polymer has a melt index ($I_2$) from 0.1 to 30 g/10 min.

9. The composition of claim 1, wherein the composition has a gel level (GI200) of less than 30 $mm^2$ gel per 24.6 $cm^3$ of film.

10. The composition of claim 1, wherein the ethylene-based polymer is a modified low density polyethylene (LDPE).

11. The composition of claim 1, further comprising a second ethylene-based polymer that differs in one or more properties from the ethylene-based polymer.

12. An article comprising at least component fouled from the composition of claim 1.

13. The article of claim 12, wherein the article is a film or a coating.

14. The article of claim 12, wherein the article is a coating for a cable or wire.

15. The article of claim 12, wherein the article is a coated sheet.

16. The composition of claim 2, wherein the ethylene-based polymer has a G' value that meets the following relationship: $G' \geq C + D \log(I_2)$, wherein C=162 Pa and D=−90 Pa/log(dg/min).

17. The composition of claim 2, further comprising a second ethylene-based polymer that differs in one or more properties from the ethylene-based polymer.

18. An article comprising at least component formed from the composition of claim 2.

19. The composition of claim 1, wherein the at least one incorporated structure is derived from a polyene selected from the group consisting of i) through ix).

20. The composition of claim 2, wherein the at least one incorporated structure is derived from a polyene selected from the group consisting of i) through ix).

* * * * *